(12) United States Patent
Pohl et al.

(10) Patent No.: US 10,937,325 B2
(45) Date of Patent: Mar. 2, 2021

(54) COLLISION AVOIDANCE SYSTEM, DEPTH IMAGING SYSTEM, VEHICLE, OBSTACLE MAP GENERATOR, AND METHODS THEREOF

(71) Applicant: Intel Corporation, Santa Clara, CA (US)

(72) Inventors: Daniel Pohl, Puchheim (DE); Markus Achtelik, Woerthsee (DE); Bastian Jaeger, Munich (DE); Andre Ryll, Gilching (DE); Jan Willem Vervoorst, Gauting (DE)

(73) Assignee: INTEL CORPORATION, Santa Clara, CA (US)

(*) Notice: Subject to any disclaimer, the term of this patent is extended or adjusted under 35 U.S.C. 154(b) by 85 days.

(21) Appl. No.: 16/233,245

(22) Filed: Dec. 27, 2018

(65) Prior Publication Data
US 2019/0156684 A1    May 23, 2019

(51) Int. Cl.
*G08G 5/00* (2006.01)
*G06T 7/50* (2017.01)
(Continued)

(52) U.S. Cl.
CPC ......... *G08G 5/0069* (2013.01); *B64C 39/024* (2013.01); *G01S 19/14* (2013.01);
(Continued)

(58) Field of Classification Search
CPC .. G08G 5/0069; G08G 5/0021; G08G 5/0086; G08G 5/045; G06T 7/50; B64C 39/024; G01S 19/14; G05D 1/0202
See application file for complete search history.

(56) References Cited

U.S. PATENT DOCUMENTS

| 8,761,457 | B1* | 6/2014 | Seitz | ............... G06K 9/6202 |
| | | | | 382/113 |
| 2011/0128379 | A1 | 6/2011 | Lee et al. | |

(Continued)

OTHER PUBLICATIONS

"Random Sample Consensus" [online]. Wikipedia, 2020 [retrieved on May 19, 2020]. Retrieved from the Internet: <URL: https://en.wikipedia.org/wiki/Random_sample_consensus >, 10 pages (Year: 2020).*

(Continued)

*Primary Examiner* — David F Dunphy
(74) *Attorney, Agent, or Firm* — Viering, Jentschura & Partner MBB

(57) ABSTRACT

According to various aspects, an obstacle map generator is provided, including: one or more processors configured to receive one or more depth images from a depth imaging system, determine, for each depth image of the one or more received depth images, a first set of pixels and a second set of pixels, each pixel of the first set of pixels has a depth value assigned thereto and each pixel of the second set of pixels has no depth value assigned thereto or has a depth value outside a predefined depth value range assigned thereto, assign a pre-defined depth value to one or more pixels of the second set of pixels, and generate an obstacle map based on the determined first set of pixels and the one or more pixels of the second set of pixels having the pre-defined depth value assigned thereto.

19 Claims, 14 Drawing Sheets

(51) Int. Cl.
    *B64C 39/02*     (2006.01)
    *G01S 19/14*     (2010.01)
    *G05D 1/02*     (2020.01)
    *G08G 5/04*     (2006.01)

(52) U.S. Cl.
    CPC ............ *G05D 1/0202* (2013.01); *G06T 7/50* (2017.01); *G08G 5/0021* (2013.01); *G08G 5/0086* (2013.01); *G08G 5/045* (2013.01); *B64C 2201/145* (2013.01); *G06T 2207/10028* (2013.01); *G06T 2207/30261* (2013.01)

(56) References Cited

U.S. PATENT DOCUMENTS

| | | | |
|---|---|---|---|
| 2016/0314373 A1* | 10/2016 | Schoenberg | G06T 7/50 |
| 2017/0243355 A1 | 8/2017 | Lin et al. | |
| 2017/0308103 A1 | 10/2017 | Li | |
| 2017/0368686 A1 | 12/2017 | Lin et al. | |
| 2018/0047182 A1* | 2/2018 | Gelb | G06T 7/77 |
| 2018/0218533 A1* | 8/2018 | Millin | G05D 1/0094 |
| 2018/0350086 A1 | 12/2018 | Sweet, III et al. | |
| 2019/0129039 A1* | 5/2019 | Schubert | G01S 17/933 |
| 2019/0156684 A1 | 5/2019 | Pohl et al. | |

OTHER PUBLICATIONS

International Search Report issued for corresponding WO application PCT/US2019/062084, dated Mar. 19, 2020, 12 pages. (for informational purpose only).

\* cited by examiner

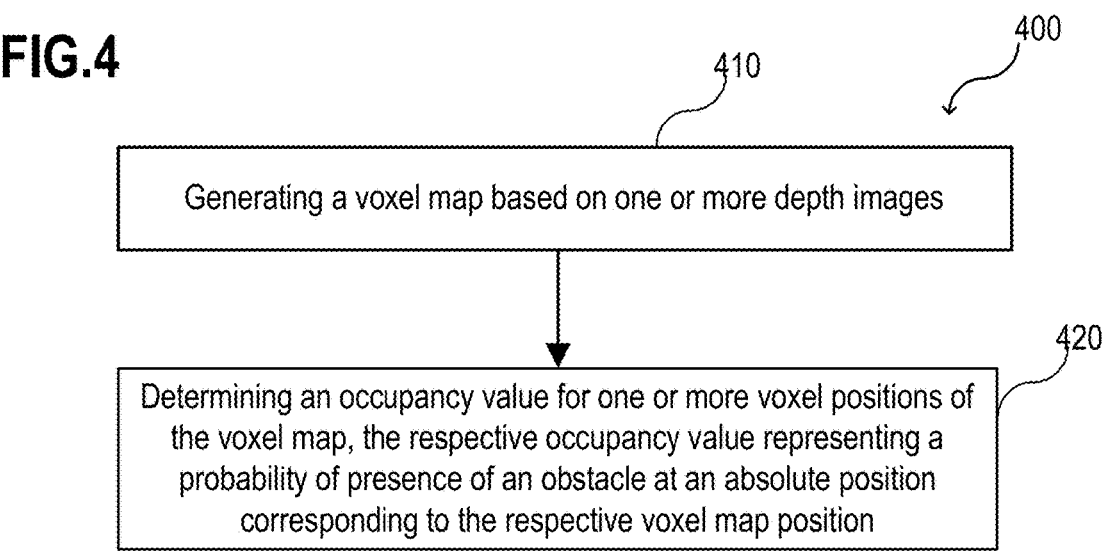
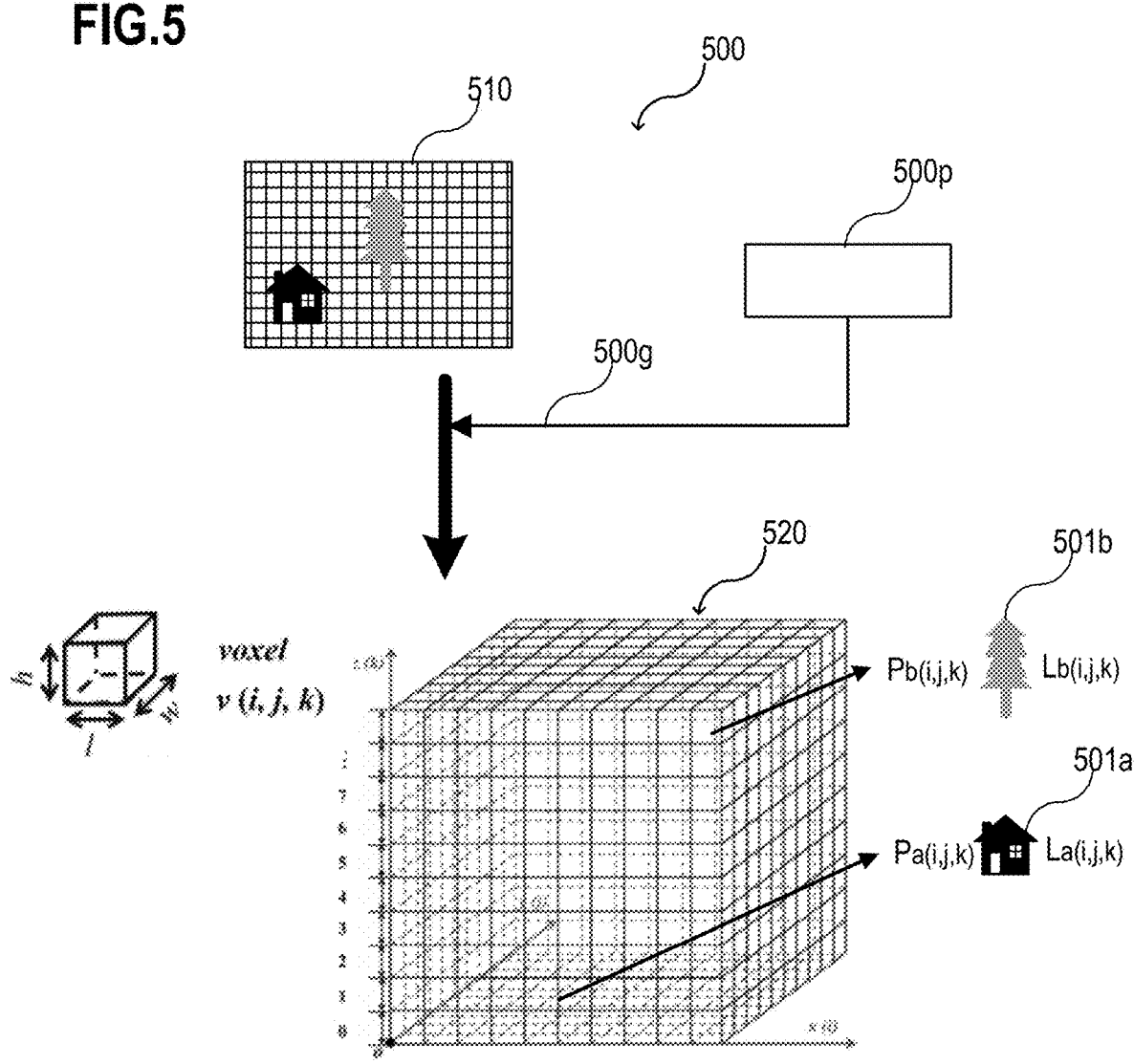

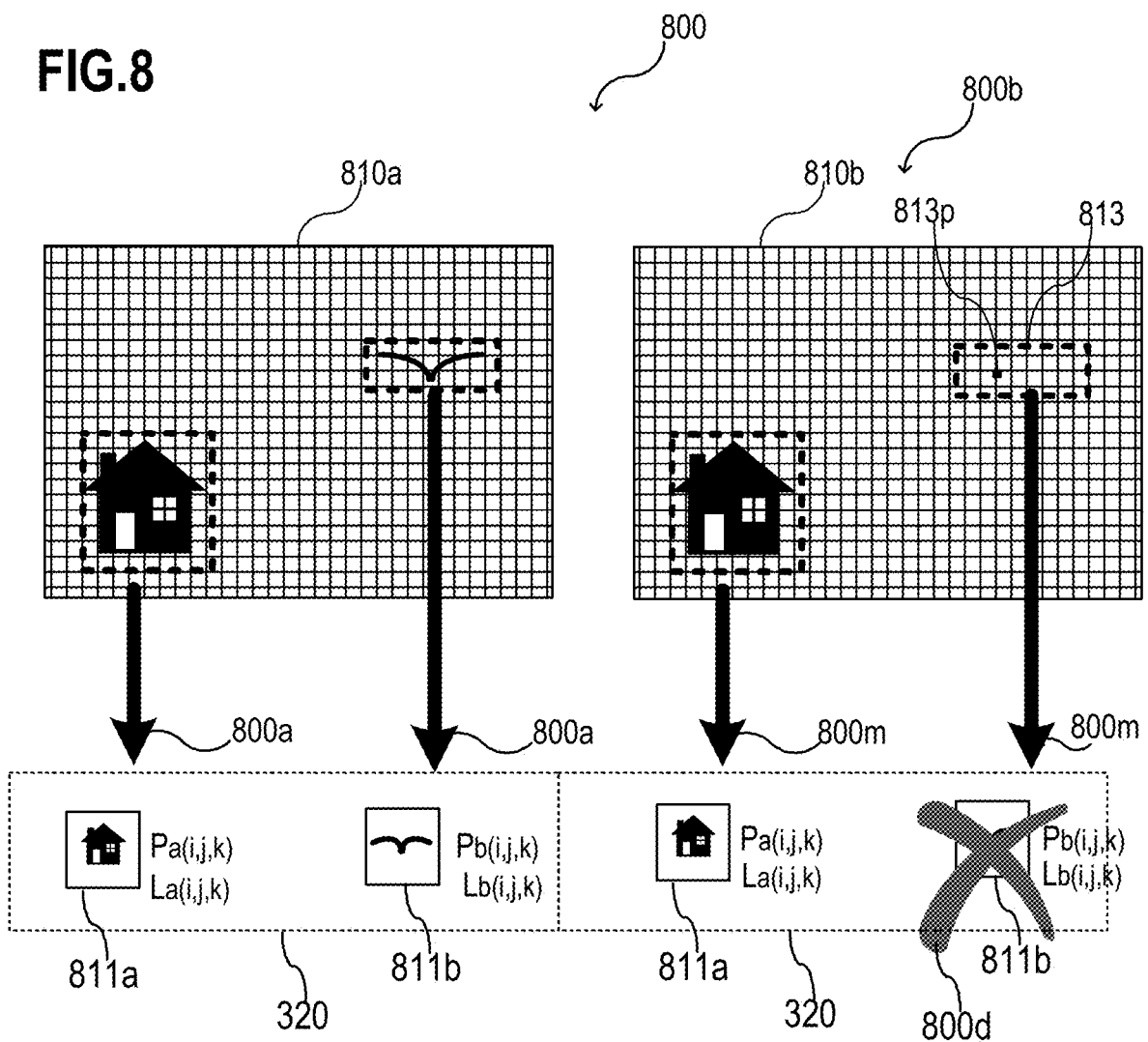

US 10,937,325 B2

COLLISION AVOIDANCE SYSTEM, DEPTH IMAGING SYSTEM, VEHICLE, OBSTACLE MAP GENERATOR, AND METHODS THEREOF

TECHNICAL FIELD

Various aspects relate generally to a collision avoidance system, a depth imaging system, a vehicle, an obstacle map generator, and methods thereof.

BACKGROUND

An unmanned aerial vehicle (UAV) may have a one or more processors to control flight of the unmanned aerial vehicle along a predefined flight path. The one or more processors to control flight of the unmanned aerial vehicle may be also referred to as a flight controller or may be part of a flight controller. The predefined flight path may be provided and/or modified, for example, by manual remote control, waypoint control, target tracking, etc. Further, an obstacle detection and avoidance system may be implemented to avoid collision of the unmanned aerial vehicle with an obstacle located in the predefined flight path of the unmanned aerial vehicle. As an example, an unmanned aerial vehicle with obstacle detection may be configured to stop in front of a solid object, as for example, a wall, a tree, a pillar, etc., and thus avoid a collision. As an example, the obstacle detection may be based on at least one imaging system and the unmanned aerial vehicle may include one or more processors associated with the at least one imaging system. However, the obstacle detection may be based on other suitable sensor systems as well.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which:

FIG. 4 shows a flow diagram of a method for generating an obstacle map, according to various aspects;

FIG. 5 shows an obstacle map generator in a schematic view, according to various aspects;

FIG. 8 shows a generation of an obstacle map in a schematic view, according to various aspects;

DESCRIPTION

Figure 1:
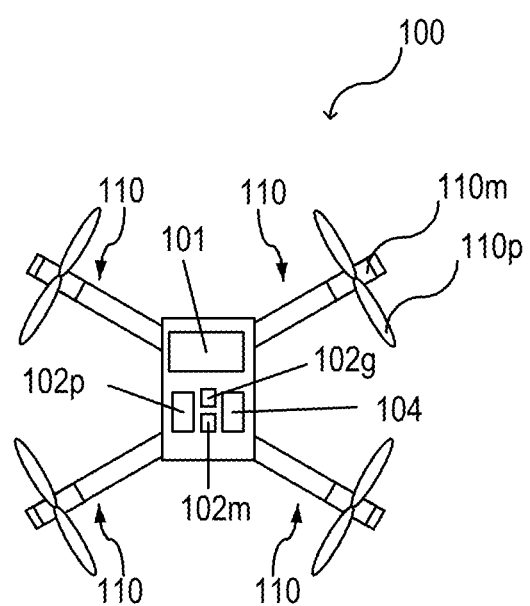
FIG. 1 shows an unmanned aerial vehicle in a schematic view, according to various aspects.

The following detailed description refers to the accompanying drawings that show, by way of illustration, specific details and aspects in which the disclosure may be practiced. One or more aspects are described in sufficient detail to enable those skilled in the art to practice the disclosure. Other aspects may be utilized and structural, logical, and/or electrical changes may be made without departing from the scope of the disclosure. The various aspects of the disclosure are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The term "exemplary" may be used herein to mean "serving as an example, instance, or illustration". Any aspect or design described herein as "exemplary" is not necessarily to be construed as preferred or advantageous over other aspects or designs.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g., "a plurality of (objects)", "multiple (objects)") referring to a quantity of objects expressly refers more than one of the said objects. The terms "group (of)", "set (of)", "collection (of)", "series (of)", "sequence (of)", "grouping (of)", etc., and the like in the description and in the claims, if any, refer to a quantity equal to or greater than one, i.e. one or more.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art. Any type of information, as described herein, may be handled for example via a one or more processors in a suitable way, e.g. as data.

The terms "processor" or "controller" as, for example, used herein may be understood as any kind of entity that allows handling data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" detailed herein may be understood to include any suitable type of memory or memory device, e.g., a hard disk drive (HDD), a solid-state drive (SSD), a flash memory, etc.

Differences between software and hardware implemented data handling may blur. A processor, controller, and/or circuit detailed herein may be implemented in software, hardware and/or as hybrid implementation including software and hardware.

The term "system" (e.g., a sensor system, a control system, a computing system, etc.) detailed herein may be understood as a set of interacting elements, wherein the elements can be, by way of example and not of limitation, one or more mechanical components, one or more electrical components, one or more instructions (e.g., encoded in storage media), and/or one or more processors, and the like.

The term "position" used with regard to a "position of an unmanned aerial vehicle", "position of an object", "position of an obstacle", and the like, may be used herein to mean a point or region in a two- or three-dimensional space. It is understood that suitable coordinate systems with respective reference points are used to describe positions, vectors, movements, and the like. The term "flight path" used with regard to a "predefined flight path", a "traveled flight path", a "remaining flight path", and the like, may be understood as a trajectory in a two- or three-dimensional space. The flight path may include a series (e.g., a time-resolved series) of positions along which the unmanned aerial vehicle has traveled, a respective current position, and/or at least one target position towards which the unmanned aerial vehicle is traveling. The series of positions along which the unmanned aerial vehicle has traveled may define a traveled flight path. The current position and the at least one target position may define a remaining flight path.

The term "map" used with regard to a two- or three-dimensional map may include any suitable way of describing positions of objects in the two- or three-dimensional space.

According to various aspects, a voxel map may be used to describe objects in the three dimensional space based on voxels associated with objects. To prevent collision based on a voxel map, ray-tracing, ray-casting, rasterization, etc., may be applied to the voxel data.

An unmanned aerial vehicle (UAV) is an aircraft that has the capability of autonomous flight. In autonomous flight, a human pilot is not aboard and in control of the unmanned aerial vehicle. The unmanned aerial vehicle may also be denoted as an unstaffed, uninhabited or unpiloted aerial vehicle, -aircraft or -aircraft system or drone.

The unmanned aerial vehicle, according to various aspects, may include a support frame that serves as a basis for mounting components of the unmanned aerial vehicle, such as, for example, motors, sensors, mechanic, transmitter, receiver, and any type of control to control the functions of the unmanned aerial vehicle as desired. One or more of the components mounted to the support frame may be at least partially surrounded by a shell (also referred to as body, hull, outer skin, etc.). As an example, the shell may mechanically protect the one or more components. Further, the shell may be configured to protect the one or more components from moisture, dust, radiation (e.g. heat radiation), etc.

The unmanned aerial vehicle, according to various aspects, may include a camera gimbal having an independent two- or three-axis degree of freedom to properly track a target, e.g. a person or point of interest, with a tracking camera independently of an actual flight direction or actual attitude of the unmanned aerial vehicle. In some aspects, a depth camera may be used for tracking, monitoring the vicinity, providing images to a user of the unmanned aerial vehicle, etc. A depth camera may allow the association of depth information with an image, e.g., to provide a depth image. This allows, for example, the ability to provide an image of the vicinity of the unmanned aerial vehicle including depth information about one or more objects depicted in the image.

As an example, a depth image may include information to indicate a relative distance of objects displayed in the image. This distance information may be, but is not limited to, colors and/or shading to depict a relative distance from a sensor. Positions of the objects may be determined from the depth information. Based on depth images, a two dimensional map or a three dimensional map may be constructed from the depth information. Said map construction may be achieved using a depth map engine, which may include one or more processors or a non-transitory computer readable medium configured to create a pixel or voxel map (or any other suitable map) from the depth information provided by the depth images. According to various aspects, a depth image may be obtained by a stereo camera, e.g., calculated from two or more images having a different perspective. Further, a depth image may be generated by any suitable one or more sensors (e.g. a laser scanner, etc.) that may allow for a correlation of position information and distance (depth) information.

According to various aspects, a map may be used to store position information and/or the ambient condition information in a suitable form of data that allows controlling one or more operations of the unmanned aerial vehicle based on the map. However, other suitable implementations may be used to allow control of the unmanned aerial vehicle based on at least the movement data.

The unmanned aerial vehicle, according to various aspects, includes at least one sensor for obstacle detection, e.g. only one sensor, two sensors, or more than two sensors. The at least one sensor can be fixedly mounted on the support frame of the unmanned aerial vehicle. Alternatively, the at least one sensor may be fixed to a movable mounting structure so that the at least one sensor may be aligned into a desired direction.

According to various aspects, an unmanned aerial vehicle may have a heading direction. The heading direction may be understood as a reference direction assigned with a straight-forward flight direction.

The unmanned aerial vehicle described herein can be in the shape of an airplane (e.g. a fixed wing airplane) or a copter (e.g. multi rotor copter), i.e. a rotorcraft unmanned aerial vehicle, e.g. a quad-rotor unmanned aerial vehicle, a hex-rotor unmanned aerial vehicle, an octo-rotor unmanned aerial vehicle. The unmanned aerial vehicle described herein may include a plurality of rotors (e.g., three, four, five, six, seven, eight, or more than eight rotors), also referred to as propellers. Each of the propellers has one or more propeller blades. In some aspects, the propellers may be fixed pitch propellers.

The unmanned aerial vehicle may be configured to operate with various degrees of autonomy: under remote control by a human operator, or fully or intermittently autonomously, by onboard computers. The unmanned aerial vehicle may be configured to lift-off (also referred to as take-off) and land autonomously in a lift-off and/or a landing operation mode. Alternatively, the unmanned aerial vehicle may be controlled manually by a radio control (RC) at lift-off and/or landing. The unmanned aerial vehicle may be configured to fly autonomously based on a flight path. The flight path may be a predefined flight path, for example, from a starting point or a current position of the unmanned aerial vehicle to a target position, or, the flight path may be variable, e.g., following a target that defines a target position. In some aspects, the unmanned aerial vehicle may switch into a GPS-guided autonomous mode at a safe altitude or safe distance. The unmanned aerial vehicle may have one or more fail-safe operation modes, e.g., returning to the starting point, landing immediately, etc. In some aspects, the unmanned aerial vehicle may be controlled manually, e.g., by a remote control during flight, e.g. temporarily.

In the following, an unmanned aerial vehicle is described in more detail. According to various aspects, one or more functions (e.g. one or more collision avoidance functions, one or more safety operations, one or more path finding functions, as examples) of the unmanned aerial vehicle may be controlled based on a two-dimensional or three-dimensional map.

FIG. 1 illustrates an unmanned aerial vehicle 100 in a schematic view, according to various aspects. The unmanned aerial vehicle 100 may include a plurality of (e.g., three or more than three, e.g., four, six, eight, etc.) vehicle drive arrangements 110. Each of the vehicle drive arrangements 110 may include at least one drive motor 110$m$ and at least one propeller 110$p$ coupled to the at least one drive motor 110$m$. According to various aspects, the one or more drive motors 110$m$ of the unmanned aerial vehicle 100 may be electric drive motors. Therefore, each of the vehicle drive arrangements 110 may be also referred to as electric drive or electric vehicle drive arrangement.

Further, the unmanned aerial vehicle 100 may include one or more processors 102$p$ configured to control flight or any other operation of the unmanned aerial vehicle 100. One or more of the processors 102$p$ may be part of a flight controller or may implement a flight controller. The one or more processors 102$p$ may be configured, for example, to provide a flight path based at least on a current position of the unmanned aerial vehicle 100 and a target position for the unmanned aerial vehicle 100. In some aspects, the one or more processors 102$p$ may control the unmanned aerial vehicle 100 based on the map, as described in more detail below. In some aspects, the one or more processors 102$p$ may directly control the drive motors 110$m$ of the unmanned aerial vehicle 100, so that in this case no additional motor controller may be used. Alternatively, the one or more processors 102$p$ may control the drive motors 110$m$ of the unmanned aerial vehicle 100 via one or more additional motor controllers. The motor controllers may control a drive power that may be supplied to the respective motor. The one or more processors 102$p$ may include or may implement any type of controller suitable for controlling the desired functions of the unmanned aerial vehicle 100. The one or more processors 102$p$ may be implemented by any kind of one or more logic circuits.

According to various aspects, the unmanned aerial vehicle 100 may include one or more memories 102$m$. The one or more memories 102$m$ may be implemented by any kind of one or more electronic storing entities, e.g. a one or more volatile memories and/or one or more non-volatile memories. The one or more memories 102$m$ may be used, e.g., in interaction with the one or more processors 102$p$, to build and/or store the map, according to various aspects.

Further, the unmanned aerial vehicle 100 may include one or more power supplies 104. The one or more power supplies 104 may include any suitable type of power supply, e.g., a directed current (DC) power supply. A DC power supply may include one or more batteries (e.g., one or more rechargeable batteries), etc.

According to various aspects, the unmanned aerial vehicle 100 may include one or more sensors 101. The one or more sensors 101 may be configured to monitor a vicinity of the unmanned aerial vehicle 100. The one or more sensors 101 may be configured to detect obstacles in the vicinity of the unmanned aerial vehicle 100. According to various aspects, the one or more processors 102$p$ may be further configured to modify a predefined flight path of the unmanned aerial vehicle 100 based on detected obstacles to generate a collision free flight path to the target position avoiding obstacles in the vicinity of the unmanned aerial vehicle. According to various aspects, the one or more processors may be further configured to reduce altitude of the unmanned aerial vehicle 100 to avoid a collision during flight, e.g., to prevent a collision with a flying object approaching unmanned aerial vehicle 100 on a collision course. As an example, if the unmanned aerial vehicle 100 and the obstacle may approach each other and the relative bearing remains the same over time, there may be a likelihood of a collision.

The one or more sensors 101 may include, for example, one or more cameras (e.g., a depth camera, a stereo camera, etc.), one or more ultrasonic sensors, one or more radar (radio detection and ranging) sensors, one or more lidar (light detection and ranging) sensors, etc. The one or more sensors 101 may include, for example, any other suitable sensor that allows a detection of an object and the corresponding position of the object. The unmanned aerial vehicle 100 may further include a position detection system 102$g$. The position detection system 102$g$ may be based, for example, on global positioning system (GPS) or any other available positioning system. Therefore, the one or more processors 102$p$ may be further configured to modify a predefined flight path of the unmanned aerial vehicle 100 based on data obtained from the position detection system 102$g$. The position detection system 102$g$ may be used, for example, to provide position and/or movement data of the unmanned aerial vehicle 100 itself (including a position, e.g., a direction, a speed, an acceleration, etc., of the unmanned aerial vehicle 100). However, other sensors (e.g., image sensors, a magnetic senor, etc.) may be used to provide position and/or movement data of the unmanned aerial vehicle 100. The position and/or movement data of both the unmanned aerial vehicle 100 and of the one or more obstacles may be used to predict a collision (e.g., to predict an impact of one or more obstacles with the unmanned aerial vehicle).

According to various aspects, the one or more processors 102p may include (or may be communicatively coupled with) at least one transceiver configured to provide an uplink transmission and/or downlink reception of radio signals including data, e.g. video or image data and/or commands. The at least one transceiver may include a radio frequency (RF) transmitter and/or a radio frequency (RF) receiver.

The one or more processors 102p may further include (or may be communicatively coupled with) an inertial measurement unit (IMU) and/or a compass unit. The inertial measurement unit may allow, for example, a calibration of the unmanned aerial vehicle 100 regarding a predefined plane in a coordinate system, e.g., to determine the roll and pitch angle of the unmanned aerial vehicle 100 with respect to the gravity vector (e.g. from planet earth). Thus, an orientation of the unmanned aerial vehicle 100 in a coordinate system may be determined. The orientation of the unmanned aerial vehicle 100 may be calibrated using the inertial measurement unit before the unmanned aerial vehicle 100 is operated in flight modus. However, any other suitable function for navigation of the unmanned aerial vehicle 100, e.g., for determining a position, a velocity (also referred to as flight velocity), a direction (also referred to as flight direction), etc., may be implemented in the one or more processors 102p and/or in additional components coupled to the one or more processors 102p. To receive, for example, position information and/or movement data about one or more obstacles, the input of a depth image camera and image processing may be used. Further, to store the respective information in the (e.g., internal) map of the unmanned aerial vehicle 100, as described herein, at least one computing resource may be used.

The unmanned aerial vehicle 100 may be referred to herein as drone. However, a drone may include other unmanned vehicles, e.g. unmanned ground vehicles, water vehicles, etc. In a similar way, the drone may be any vehicle having one or more autonomous functions that are associated with a control of a movement of the vehicle.

Various aspects are related to an obstacle avoidance system that is configured to allow obstacle avoidance using depth imaging sensors. In some aspects, the obstacle avoidance system may allow for a minimization of the risk of crashes of an unmanned aerial vehicle or any other drone. In another aspect, the obstacle avoidance system may allow for an efficient inspection of a structure (e.g. of a building, of a machine, etc.).

Various autonomous operation modes of a vehicle may require a knowledge of the absolute position and the heading of the vehicle in the real space. Usually, the position of the drone is determined based on GPS (Global Positioning System) information, e.g. RTK (Real Time Kinematic) GPS information. The heading of the vehicle may be determined from time resolved GPS information, from compass information, from image analyses, etc. The vehicle may include a depth imaging system with a fixed relationship with respect to the heading of the vehicle. Therefore, knowing the absolute position and the heading of the vehicle may allow generating a three-dimensional map (e.g. a voxel map) that represents one or more obstacles detected by the depth imaging system of the vehicle. For the generation of the three-dimensional map (e.g. the voxel map or any other suitable map), the depth information of the depth images generated by the depth imaging system may be transformed into absolute position information represented in the three-dimensional map.

Sensors, as for example, ultrasonic sensors, laser scanners, radar sensors, lidar sensors, etc., may be used to at least some extent to generate a depth image. However, they may not provide the detailed view as it can be obtained from one or more depth cameras, as example.

In order to do efficient obstacle avoidance on drones, it may be beneficial to have a map of the area surrounding the drone. The map may include one or more map objects representing one or more obstacles detected in a vicinity of the drone. In some aspects, the map may be generated over time and the map objects representing the one or more detected obstacles may be stored. Compared to a single snapshot of time, this enables, for example, continuous knowledge of the surrounding of the drone, especially if the drone does not have sensors in all directions (e.g. if the drone has not a 360° view in the horizontal plane).

According to some aspects, one or more depth sensors (e.g. one or more depth camera) may be configured to create depth images (e.g. with 16-bit content) that may indicate the distance to objects between 0 meter and a pre-defined maximal range, e.g. 65 meters. Based on those depth images, a voxel map may be generated which may remain active substantially during the complete flight time. This may enable, for example, that once an object has been detected by any of the depth cameras of the drone, the drone may avoid flying into the detected obstacles at a later time, given that the obstacles a stationary. Once the map is generated, the drone may avoid collision with an obstacle even in the case that the drone is approaching the obstacle along a direction where currently no depth camera is pointing. For example, if a certain tree has been observed, the drone may later move backwards towards that tree and will stop flying into the tree to avoid any collisions.

While this principle may works very well for static scenarios, challenges may arise in a dynamic scenario including moving obstacles. According to various aspects, a selective forget functionality is described for an obstacle map, e.g. for a voxel map, wherein the selective forget functionality enables flying a drone in an area with dynamic obstacles with a highly efficient and robust obstacle avoidance. This may be, for example, useful for swarm-based inspections tasks where collisions between a plurality of moving drones has to be avoided.

Figure 2:
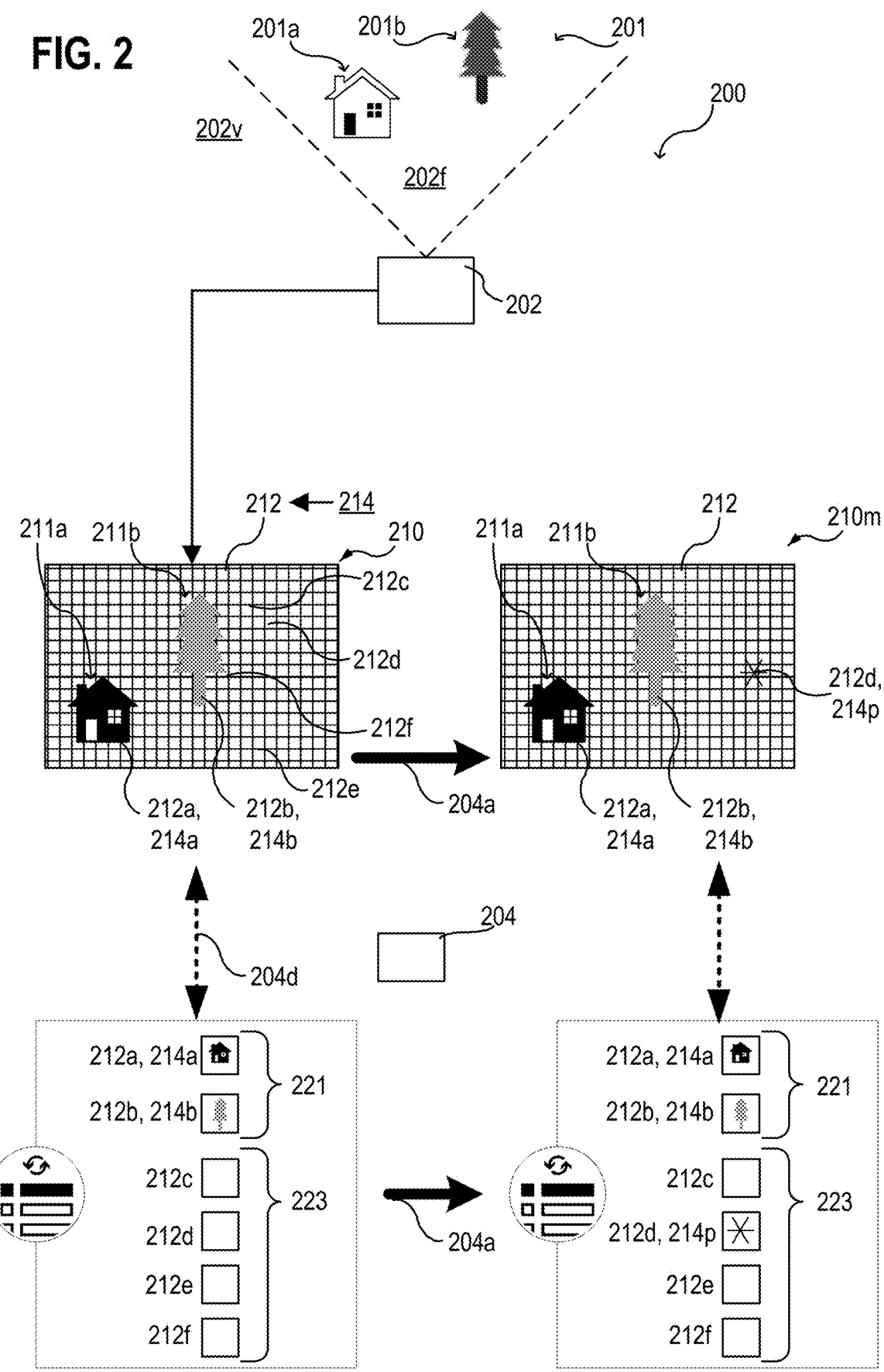
FIG. 2 shows a depth imaging system in a schematic view, according to various aspects.

FIG. 2 shows various functions of a depth imaging system 200, according to various aspects. In some aspects, the depth imaging system 200 may be part of a collision avoidance system. The depth imaging system 200 or a collision avoidance system including the depth imaging system 200 may be implemented in an unmanned aerial vehicle (e.g. in the unmanned aerial vehicle described with reference to FIG. 1) or any other drone. The depth imaging system 200 may include one or more depth imaging sensors 202, as example. The one or more depth imaging sensors 202 may be configured to generate a depth image 210 of a vicinity 202v of the one or more depth imaging sensors 202. In some aspects, the depth imaging system 200 may be configured to generate a time sequence of depth images 210. In the case that the one or more depth imaging sensors 202 are part of a drone (e.g.

an unmanned aerial vehicle), the one or more depth imaging sensors 202 may provide depth images 210 of a vicinity of the drone. Each of the one or more depth imaging sensors 202 or a group of the one or more depth imaging sensors 202 may define a respective field of view 202f.

Each depth image 210 generated by the one or more depth imaging sensors 202 may include, for example, a plurality of pixels 212. Depth information 214 may be represented in the depth image 210 by depth values that may be assigned to corresponding pixels of the plurality of pixels 212. Instead of a single pixel, a corresponding group of pixels may be used and the respective depth value may be assigned to the group of pixels. Each pixel or each group of pixels of the depth image 210 may have a position within the image (also referred to as pixel or pixel position) that may be correlated with a direction starting from the viewpoint of the depth imaging system 200. In other words, direction information correlated with the depth information may be represented in the depth image 210 by the pixel position within the depth image 210. According to various aspects, absolute position information representing an absolute position of the one or more obstacles 201 in the real space may be determined based on the pixel positions and the depth values that are correlated with the respective pixels 212 of the depth image 210. As an example, a map (e.g. a three-dimensional voxel map) may be generated including map objects representing the absolute positions of the one or more obstacles 201. The generated map may be used to control a vehicle to avoid a collision with the one or more obstacles 201.

According to various aspects, the one or more depth imaging sensors 202 may receive obstacle information associated with one or more obstacles 201. As an example, a first obstacle 201a may be closer to the one or more depth imaging sensors 202 than a second obstacle 201b. As a result, in the depth image 210, a first image object 211a that represents the first obstacle 201a may include one or more first pixels 212a having one or more first depth values 214a assigned thereto and a second image object 211b that represents the second obstacle 201b may include one or more second pixels 212b having one or more second depth values 214b assigned thereto, wherein the one or more first depth values 214a are lower than the one or more second depth values 214b. It is understood that there may be various different situations in which, for example, no obstacle 201 may be detected, only one obstacle 201 may be detected, or a plurality of obstacles 201 may be detected.

In some aspects, each depth image 210 may include pixels having depth values assigned thereto representing one or more obstacles 201 detected via the one or more depth imaging sensors 202. These pixels and corresponding depth values may be referred to as valid and may be used as basis for the obstacle detection and avoidance functions. The valid depth ranges may include depth values within a predefined depth value range. Other pixels may have no valid depth value assigned thereto, e.g. including no depth value, including a depth value outside the predefined (e.g. valid) depth value range. It is understood that a depth value outside the predefined (e.g. valid) depth value range may be, in analogy, inside another a predefined (e.g. invalid) depth value range.

According to various aspects, the depth imaging system 200 may include one or more processors 204. Additionally, the depth imaging system 200 or a collision avoidance system including the depth imaging system 200 may include one or more memories (not illustrated). In some aspects, a computing system may be used to implement the functions of the depth imaging system 200 or a collision avoidance system including the depth imaging system 200. As an example, a computing system of a vehicle may be used to control the vehicle and to provide the functions of the depth imaging system 200 or a collision avoidance system including the depth imaging system 200 as well. However, a dedicated computing system may be used as well to provide the functions of the depth imaging system 200 or a collision avoidance system including the depth imaging system 200 for a vehicle. The depth imaging system 200 or a collision avoidance system including the depth imaging system 200 may be implemented into any at least partially autonomously traveling vehicle.

According to various aspects, the one or more processors 204 of the depth imaging system 200 may be configured to determine (in 204d) for the respective depth image 210 a first (e.g. valid) set of pixels 221 and a second (e.g. invalid) set of pixels 223, each pixel of the first set of pixels 221 has a (e.g. valid) depth value assigned thereto and each pixel of the second (invalid) set of pixels 223 has no depth value assigned thereto or has a depth value outside a predefined depth value range assigned thereto.

As an example, the one or more first pixels 212a defining the first image object 211a and having the one or more first depth values 214a assigned thereto may be part of the first set of pixel 221. Further, the one or more second pixels 212b defining the second image object 211b and having the one or more second depth values 214b assigned thereto may be part of the first set of pixel 221 as well. As another example, one or more pixels 212c, 212d, 212e, 212f of the depth image 210 may not have a depth value assigned thereto or may have a depth value assigned thereto that is outside a predefined depth value range so that no obstacle is represented by the one or more pixels 212c, 212d, 212e, 212f.

Further, the one or more processors 204 of the depth imaging system 200 may be configured to assign (in 204a) a pre-defined depth value 214p to one or more pixels of the second set of pixels 223. As exemplarily illustrated in FIG. 2, a pre-defined depth value 214p may assigned to pixel 212d of the second set of pixels 223.

Illustratively, a modified depth image 210m may be generated by the depth imaging system 200 by assignment of the pre-defined depth value 214p to one or more pixels of the second set of pixels 223. The modified depth image 210m may include at least the first (valid) set of pixels 221 having corresponding depth values assigned thereto and the one or more pixels of the second set of pixels 223 having the pre-defined depth value assigned thereto.

As described above, each depth value 214a, 214b assigned to a corresponding pixel 212a, 212b of the first set of pixel 221 may represent a distance of an obstacle 201a, 201b from the depth imaging system 200 or, in other words, from the one or more depth imaging sensors 202 of the depth imaging system 200. The pre-defined depth value 214p may represent, for example, a maximal measurement distance (e.g. 20 m, e.g. 30 m, e.g. a distance in the range from about 15 m to about 50 m of the depth imaging system 200.

According to various aspects, the pre-defined depth value 214p may be assigned only to a fraction of the pixels of the second set of pixels 223. As an example, a fraction of 0.1% to 10% (e.g. 0.1% to 5%, e.g. 0.1% to 1%) of a total number of pixels is selected from the second set of pixels 223 for the assignment of the pre-defined depth value 214p thereto. In some aspects, the pixels are randomly selected from the second set of pixels 223 for the assignment of the pre-defined depth value 214p thereto.

According to various aspects, the pixels of the second set of pixels 223 that have an invalid depth value and no pre-defined depth value assigned thereto may be discarded.

As an example, these pixels may not be used for the generation of the obstacle map.

According to various aspects, the one or more processors 204 of the depth imaging system 200 or of a collision avoidance system may be configured to determine, from the depth image 210, the one or more image objects 211a, 211b associated with the one or more obstacles 201a, 201b in the vicinity 202v of the one or more depth imaging sensors 202. The image objects representing the obstacles may be identified by an image analysis. As an example, the depth image 210 may be checked for pixel clouds having pixels of similar depth values within a predefined depth value range.

Figure 3:
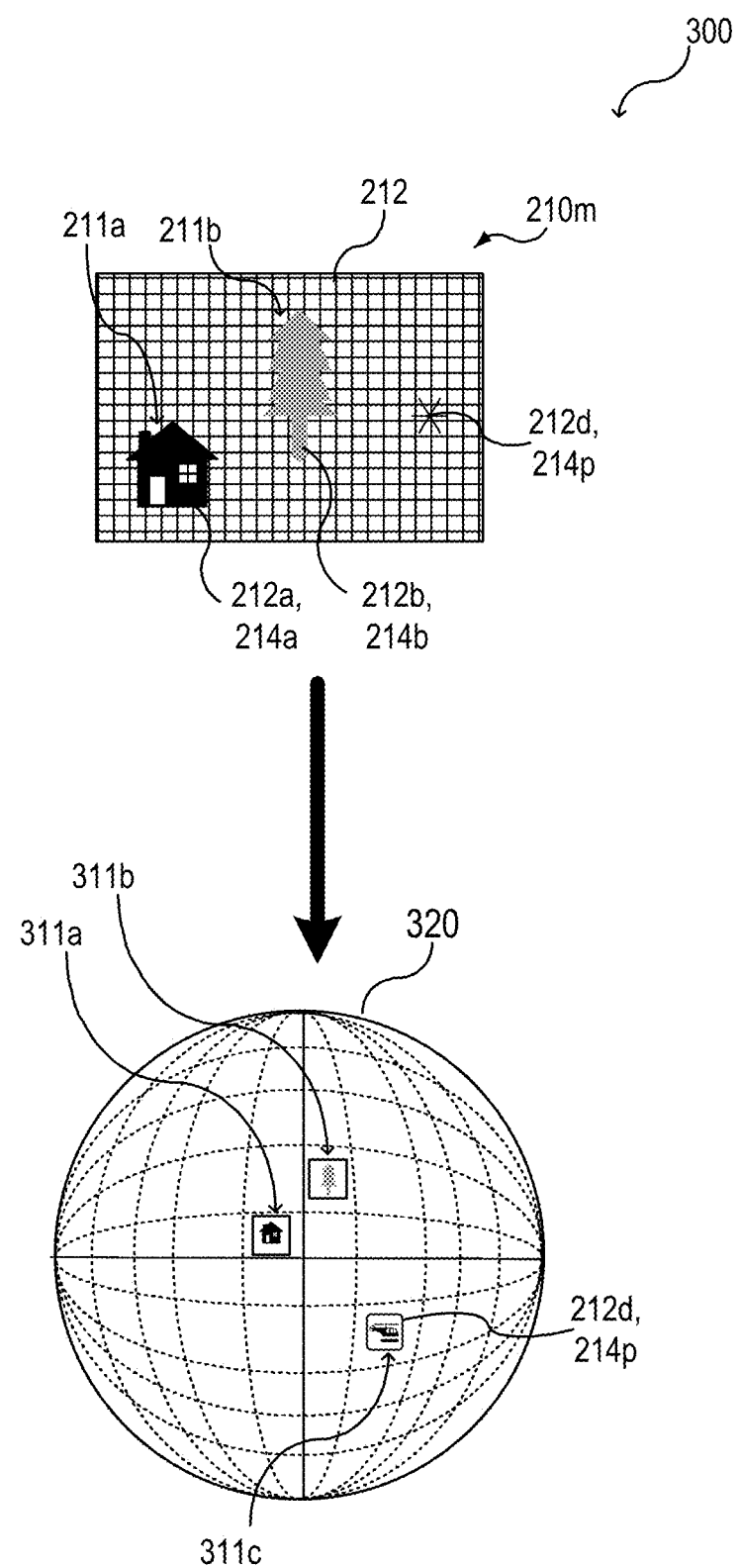
FIG. 3 shows an obstacle map generator in a schematic view, according to various aspects.

FIG. 3 shows various functions of an obstacle map generator 300, according to various aspects. In some aspects, the obstacle map generator 300 may be part of a collision avoidance system or may provide an obstacle map to a collision avoidance system. The obstacle map generator 300 or the collision avoidance system including the obstacle map generator 300 may be implemented in an unmanned aerial vehicle (e.g. in the unmanned aerial vehicle described with reference to FIG. 1) or any other drone. The obstacle map generator 300 may include a depth imaging system (for example, the depth imaging system 200 described herein) to generate a modified depth image 210m (see FIG. 2, as example) and may be configured to generate an obstacle map 320 based on the modified depth image 210m.

According to various aspects, map objects 311a, 311b may be created in the obstacle map 320 that representing the obstacles 201a, 201b detected via the depth imaging system 200. The obstacle map 320 may be configured to correlate a map position in the obstacle map 320 with an absolute position in the real space.

According to various aspects, the obstacle map 320 may include a map object 311c representing an obstacle that was detected previously, e.g. before the modified depth image 210m is generated and/or used to update and/or generate the obstacle map 320. In the case that the previously detected obstacle is not present anymore at the position in the real space as indicated by the map object 311c, the depth image 210 does not represent this previously detected obstacle anymore. According to various aspects, the map object 311c that may be not valid anymore may be removed from the obstacle map 320. According to various aspects, the map object 311c that may be not valid anymore may be removed from the obstacle map 320 or tagged based on the modified depth image 210m. As an example, the map object 311c may be tagged as invalid. As another example, a probability value (also referred to as confidence value or occupancy value) may be assigned to the map object 311c that represents a probability of presence or absence of the obstacle in the real space corresponding to the map object 311c. In the case that the depth image 210 does not represent this previously detected obstacle anymore, the probability value may be reduced.

According to various aspects, a generation of a voxel map including information about a probability of presence of an obstacle in the real space is explained in more detail below.

FIG. 4 shows a flow diagram of a method 400 for generating an obstacle map, the method 400 may include: in 410, generating a voxel map based on one or more depth images; and in 420, determining an occupancy value for one or more voxel positions of the voxel map, the respective occupancy value representing a probability of the presence of an obstacle at an absolute position corresponding to the respective voxel position.

FIG. 5 shows an obstacle map generator 500 in a schematic view, according to various aspects. The obstacle map generator 500 may include one or more processors 500p configured to generate 500g a voxel map 520 based on one or more depth images 510. The one or more processors 500p may be further configured to determine, for one or more voxel positions P(i,j,k) of the voxel map 520, an occupancy value L(i,j,k). The respective occupancy value La(i,j,k), Lb(i,j,k) may represent a probability of the presence of an obstacle 501a, 501b at an absolute position corresponding to the respective voxel position Pa(i,j,k), Pb(i,j,k).

According to various aspects, the voxel map 520 may include a plurality of voxels V(i,j,k) in a grid arrangement. Each of the voxels V(i,j,k) may represent a region in the real space with predefined dimensions, e.g. height h, length 1, and width w. According to various aspects, the voxels V(i,j,k) of the voxel map 520 may represent absolute positions in the real space, or, in other words, each voxel position Pa(i,j,k), Pb(i,j,k) may be associated with a distinct absolute position in the real space. A movement of a vehicle may be controlled based on the voxel map 520 to avoid collision with obstacles 501a, 501b in the real space.

According to various aspects, ray tracing (also referred to as ray casting) may be used to determine the respective occupancy values assigned to voxels V(i,j,k) of the voxel map 520, as described in more detail below.

Figure 6A:
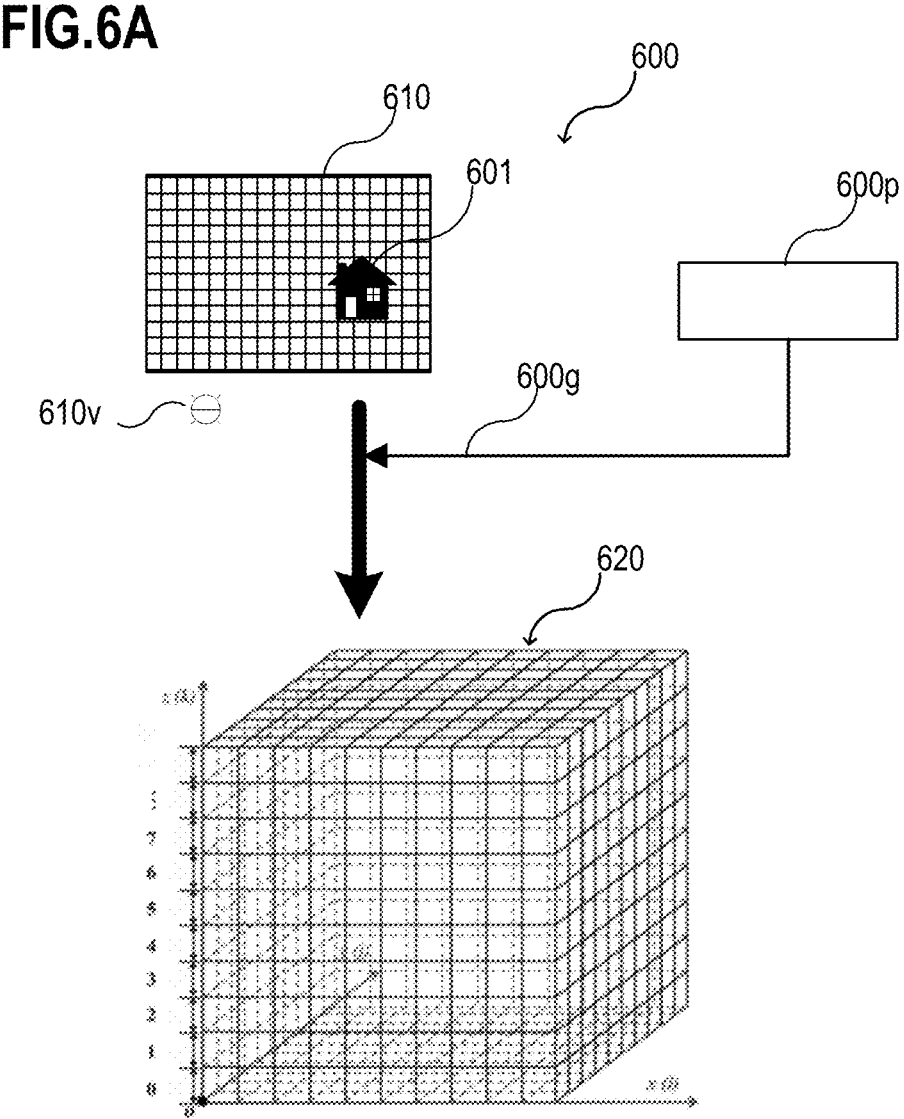
FIGS. 6A to 6C show an obstacle map generator in a schematic view and various functions thereof, according to various aspects.

FIG. 6A shows an obstacle map generator 600 in a schematic view, according to various aspects. The obstacle map generator 600 may include one or more processors 600p configured to receive a depth map 610. The depth map 610 may represent a relative position of at least one obstacle 601 relative to a viewpoint 610v associated with the depth map 610. According to various aspects, the one or more processors 600p may be configured to generate 600g a voxel map 620 based on the depth map 610.

Figure 6B:
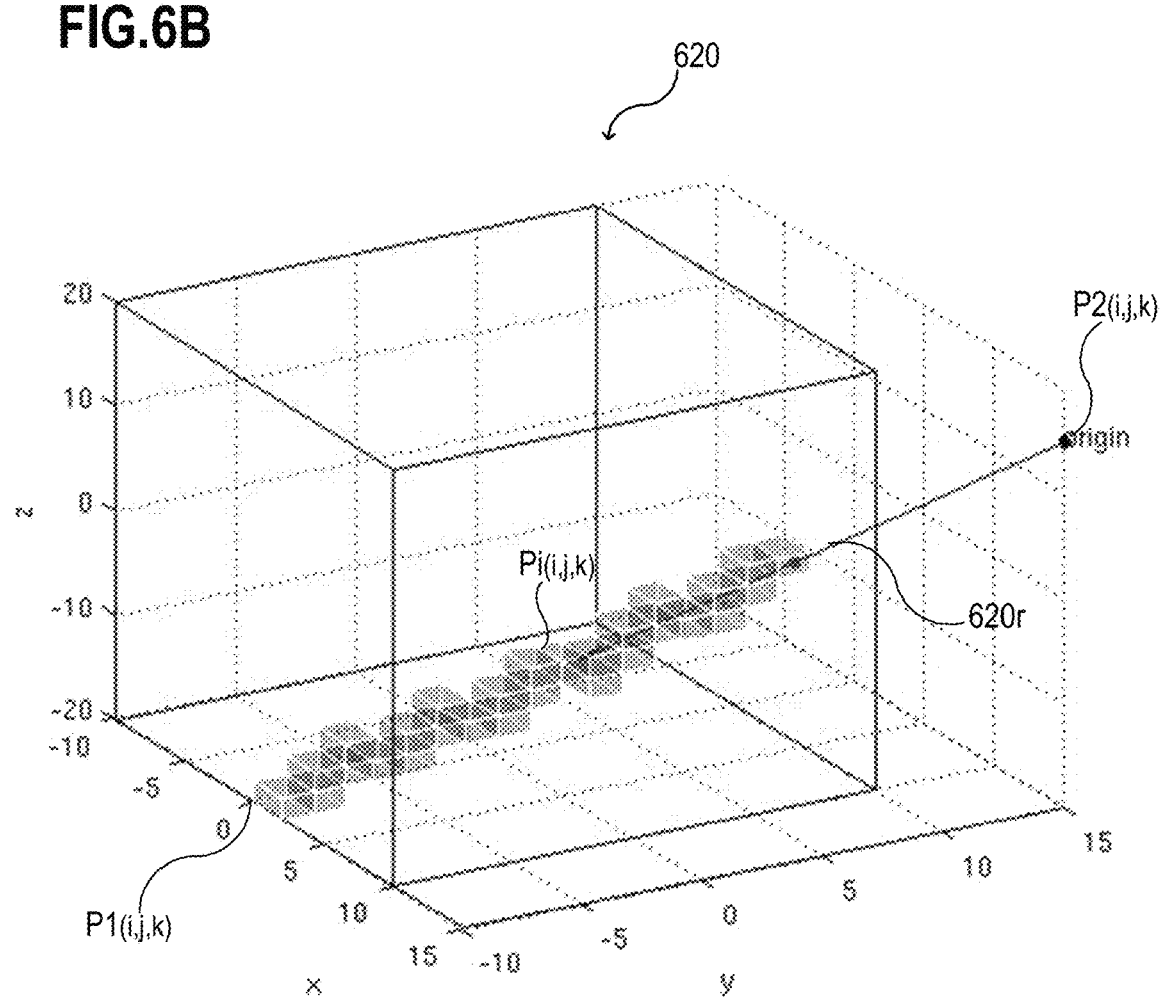

Several aspects of the determination of the voxel map 620 may be based on ray tracing, as illustrated schematically in FIG. 6B. The generation of the voxel map 620 may include determining a first voxel position P1(i,j,k) representing an absolute position of the at least one obstacle 601 and determining a second voxel position P2(i,j,k) representing an absolute position of the viewpoint 610v that is associated with the depth map 610. Illustratively, the depth map 610 may allow the assumption that there is an obstacle free space between a detected obstacle 601 and the viewpoint 610v.

According to various aspects, the generation of the voxel map 620 may further include determining one or more intermediate voxel positions Pi(i,j,k) between the first voxel position P1(i,j,k) and the second voxel position P2(i,j,k).

Figure 6C:
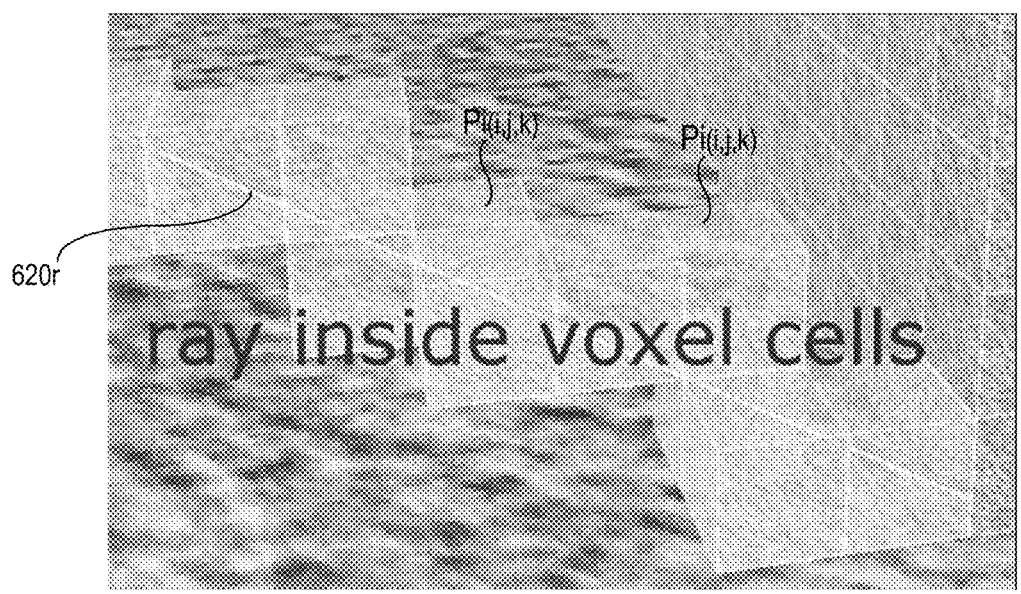

Further, an intermediate occupancy value Li(i,j,k) may be determined for each of the one or more intermediate voxel positions Pi(i,j,k), the respective intermediate occupancy value Li(i,j,k) may represent a probability of the presence of an obstacle at an absolute position corresponding to the intermediate voxel position Pi(i,j,k). The intermediate voxel positions Pi(i,j,k) may be determined by tracing a ray 620r from the second voxel position P2(i,j,k) to the first voxel position P1(i,j,k), wherein each voxel V(i,j,k) that intersects with the ray 620r may define one of the intermediate voxel positions Pi(i,j,k). FIG. 6C shows a schematic view of a ray 620r intersecting the respective voxel cells Pi(i,j,k).

According to various aspects, the voxel position may be defined by a tupel of indices (i,j,k). Dependent on the number of voxels and the associated size of a voxel in the real space, the voxel map may cover a predefined region in the real space.

According to various aspects, a depth image may be received from a depth sensor, e.g. from a depth camera or a stereo camera system. Using the depth information from the depth image, the voxel map may be built with certain probabilities for a free or occupied voxel. In general, a voxel map may be a collection of individual voxels within a grid of, for example, three dimensions. For example, a voxel may have a pre-defined voxel size associated therewith, e.g. the voxel size may be set to a value in the range from about 1 cm to about 1 m. As an example, a voxel size of 20 cm and a voxel grid of 2048×2048×2048 voxels may cover a space of 409.6×409.6×409.6 m³. Within this space, a probability value (also referred to as occupancy value) may be defined for each of the voxels. As an example, a value of zero may represent that there is no knowledge about the corresponding region, e.g. the region may be either free or occupied. A positive number may indicate that the corresponding region is occupied with a certain probability. A negative number may indicate that the corresponding region is free with a certain probability.

Ray tracing is a graphics technology that may be generally used for rendering photorealistic images. In these cases, ray tracing operates usually with free space and intersections are calculated mathematically between a ray and another object, for example a triangle. For example, a ray at origin (1.03, 3.28, 3.71) with the direction of (1.0, 0.0, 0.0) intersects an object at (1.03, 8.2, −3.04).

In the voxel space, ray tracing, which may also be called ray casting, may be used as well. However, here all operations are happening with voxel blocks and not in free mathematical space. For example, a ray with the voxel origin indices of (3, 7, 9) and a certain direction might intersect the voxel block at the indices of (7, 8, 3). In voxel ray tracing, all rays may follow along the voxel cells until they hit their target or a maximum length criterion is satisfied, as illustrated in FIGS. 6B and 6C.

According to various aspects, a ray may be traced from the camera origin up to a final position of a voxel as projected from the depth images. For every voxel cell that gets intersected by the ray, the probability value may be modified to represent either a free region or an occupied region of the real space. For example, from the depth image it may be known that an obstacle may be located at a certain position with a 10 meters distance. In this case, all voxels along a ray to this position may be set to a probability that represents a free space.

According to various aspects, the voxel map 620 may be generated from a sequence of depth images received over time, and the probability threshold for a free space may be increased with every other sample until a certain limit is reached where a maximum free value is clamped. The same may be applied for an occupied region. If occupied space may be observed over multiple depth images, the probability of occupancy may be increased with every sample until it hits a maximum value of occupancy.

According to various aspects, for each voxel, the occupancy value may be incrementally increased upon determination of an occupied space associated with the voxel and incrementally decrease upon determination of a free space associated with the voxel. As an example, the minimal occupancy value may be −1 and the maximal occupancy value may be 1, and the change of the occupancy value may be 0.2 for a single determination. Illustratively, the respective voxels may be marked as occupied or free and, with each determination, the likelihood that the real space associated with the voxel is indeed occupied or free may increase/decrease with each determination. A first threshold and a second threshold may be associated with the occupancy values. When the occupancy value reaches the first threshold (e.g. an upper threshold, e.g. 0.7) the real space associated with the voxel may be considered to be occupied by an obstacle and when the occupancy value reaches the second threshold (e.g. a lower threshold, e.g. −0.7) the real space associated with the voxel may be considered to be free of obstacles.

It has to be noted that other implementations for the determination of the probability values are possible. According to various aspects, the determination of the probability values may include predefined curves that may correlated the probability values with the distance to the respective obstacle determined from the depth map, as illustrated in the FIGS. 7A and 7B.

Figure 7A:
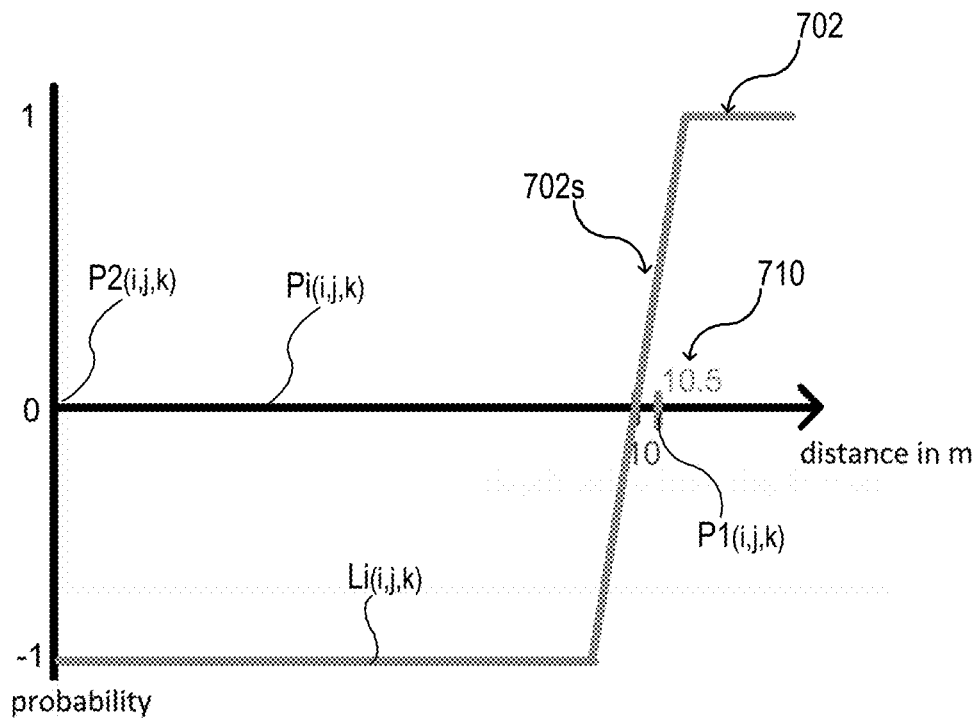
FIG. 7A and FIG. 7B show respectively a predefined function for determining probability values, according to various aspects.

FIG. 7A shows a predefined function 702 for determining probability values, according to various aspects. Between the second voxel position P2(i,j,k) (e.g. associated with the viewpoint and/or the location of the depth image sensors and/or the location of the drone) and the first voxel position P1(i,j,k) (e.g. associated with an obstacle detected via the depth images) the probability values may be set according to a predefined function, according to various aspects.

As an example, the probabilities may be determined for a given depth value 710 of 10.5 meters determined from a depth image. A (e.g. linear) slope 702s may be set in a way that the probability starts increasing from 9.5 meters upwards with the probability value of 0 (no information if occupied or free) at 10 meters up to the probability of 1 (definitely occupied) at 10.5 meters. At distances below 1.5 meters, the probability value may be set −1 (definitely free). Other values are possible in different implementations.

In other words, the distance of the obstacle and a predefined distribution of the probability value around the distance may be considered during determining the respective probability values. As illustrated in FIG. 7A, for adding the information from the depth value of 10.5 meters at a certain point in the voxel map, all voxel cells determined by ray tracing that are up to about 10 meters may be correlated with the probability value of −1, that represents that this area is very likely free. That value can be scaled further with the distance from the depth camera. As an example, close items may be more likely to have exact values compared to the ones further away. Closer to the obstacle (e.g. at a distance between 10 to 10.5 meters), the certainty that this space may be occupied may quickly rise. At a distance at 10.5 meters, the space may be definitely occupied, since otherwise the depth value would not have been set to 10.5 meters. For ray tracing, the ray may be overshot by a one or more voxel blocks to set those also to be occupied.

Figure 7B:
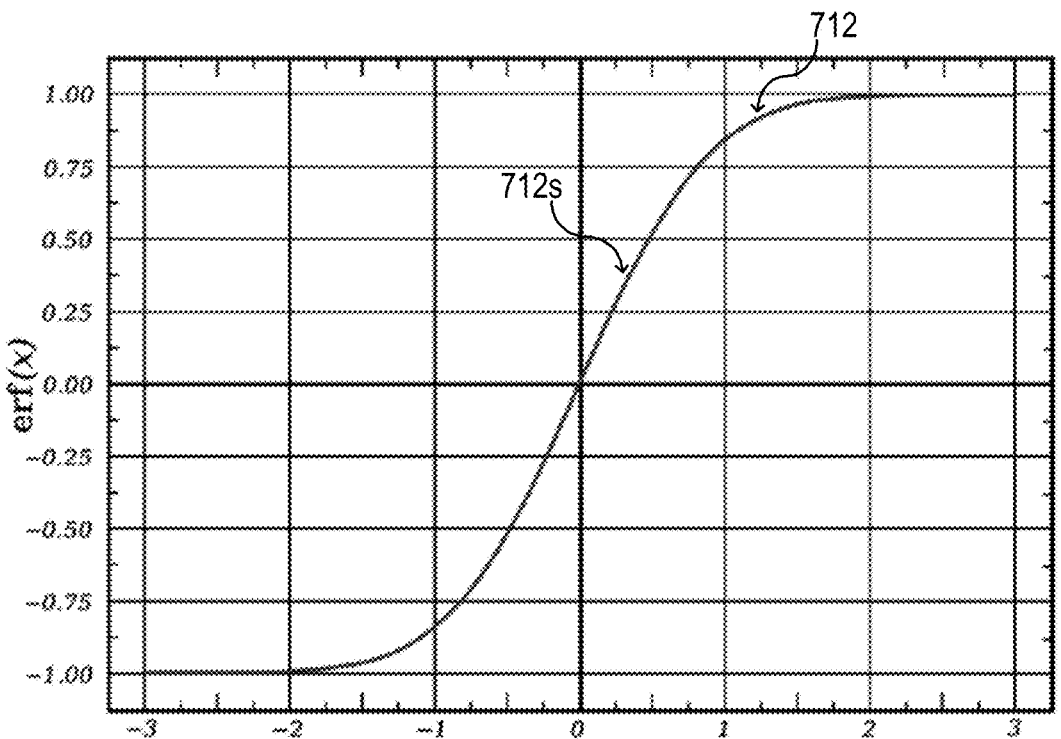

FIG. 7B shows another example for a predefined function 712 (also referred to as error function) for determining probability values. As illustrated in FIG. 7B, an at least partially curved increase 712s in the probability function may be used which may lead to more precise results as the completely linear slope 702s shown in FIG. 7A. The inclination of the approximately linear part of the at least partially curved increase 712s may be determined based on the distance from the point to the origin of the camera. This allows for a consideration of the depth error of a measurement from the depth camera (e.g. a stereo camera) that may grow quadratic with the distance.

A determination (e.g. a computation) of the probability values may be done for one or more depth cameras (e.g. one or more) stereo cameras running at, for example, 30 fps, and for thousands of rays for each of the one or more depth cameras. This may incur a significant computational burden on an embedded system of a drone.

According to various aspects, a function that represents a curved probability model may be used for determination of the occupancy values (also referred to as probability values) of one or more voxels of the voxel map. The curved probability model may represent a probability that a point (e.g. a voxel position) is within a solid object.

According to various aspects, mapping the environment of a drone or any other at least partially autonomously controlled vehicle may be much more robust against outliers, for example fake depth data from a depth camera that may be generated by errors in the stereo matches. Outliers may not be geometrically consistent and, therefore, once the drone moves, the outliers will move in some other inconsistent way. The chances may be significant to obtain only valid depth data in the areas. As a space in front of a valid occupied space is illustratively shot free in the voxel map via ray tracing, any outlier obstacles will be freed away.

Further, using the algorithms and functions described herein allows for a consideration of dynamic changes within the voxel map. For example, in the case that a drone encounters another drone in its field of view, the drone would first stop or move backwards to not hit such an obstacle. However, once the other drone has moved away, the background behind the previous position of the other drone becomes visible again. As the ray up to that further distance is traced, the space that was previously occupied by the other drone is detected to be free of obstacles.

Another aspect of the algorithms and functions described herein may be that if an object is detected far away, e.g. at 50, 60, or 70 meters of distance, there may be usually only lower confidence in the depth accuracy given today's depth sensors. However, in some aspects the knowledge of a limited measurement accuracy is considered during the generation of the voxel map. For example, if an object is detected at a distance greater than a predefined distance limit (e.g. greater than about 20 meters), an probability value may be assigned to the intermediated voxel positions that represents a free space at least within the predefined distance limit. If the object was, for example, really at a distance of 50 or 60 meters, this may be not relevant in such a case. Illustratively, probability values of voxels may be only edited with up to a predefined distance threshold, e.g. up to a distance of 20 meters.

According to various aspects, the one or more processors 500p, 600p may be respectively part of the unmanned aerial vehicle 100 or the functions provided by the one or more processors 500p, 600p may be implemented by the one or more processors 102p of the unmanned aerial vehicle 100.

A depth map, as exemplarily described herein, may include (or may be generated from) one or more depth images. The one or more depth images may be generated by any suitable sensor or sensor system, e.g. using a stereo camera. In some aspects, the one or more depth images may be generated by one or more sensors of a vehicle, e.g. of the unmanned aerial vehicle 100.

In the following, various aspects are described that may refer to one or more aspects described above, e.g. to one or more aspects of a voxel map generation described with reference to FIGS. 4, 5, 6A to 6C, and 7A to 7B.

According to various aspects, an obstacle map generator may include: one or more processors configured to receive a depth map, the depth map representing a relative position of at least one obstacle relative to a viewpoint associated with the depth map, generate a voxel map based on the depth map. In some aspects, the generation of the voxel map may include: determining a first voxel position representing an absolute position of the at least one obstacle, determining a second voxel position representing an absolute position of the viewpoint, determining one or more intermediate voxel positions between the first voxel position and the second voxel position, and determining an intermediate occupancy value for each of the one or more intermediate voxel positions, the respective intermediate occupancy value representing a probability of the presence of an obstacle at an absolute position corresponding to the intermediate voxel position. The obstacle map generator may optionally further include that the generation of the voxel map further includes determining a first occupancy value for the first voxel position, the first occupancy value representing a probability of the presence of the at least one obstacle at the absolute position of the at least one obstacle. The obstacle map generator may optionally further include that the first occupancy value represents a higher probability than the respective intermediate occupancy value. The obstacle map generator may optionally further include that the determination of the one or more intermediate voxel positions includes tracing a ray from the second voxel position to the first voxel position, wherein each voxel at the one or more intermediate voxel positions intersect with the traced ray. The obstacle map generator may optionally further include that the determination of the respective intermediate occupancy value includes summing up one or more occupancy values determined consecutively for the respective voxel position. The obstacle map generator may optionally further include that the first occupancy value and the respective intermediate occupancy value are in a range between a first boundary value and a second boundary value. In some aspects, the first boundary value represents a definite presence of free space and the second boundary value represents a definite presence of an obstacle. The obstacle map generator may optionally further include that the first occupancy value and the respective intermediate occupancy value are determined based on a measurement accuracy associated with the depth map. The obstacle map generator may optionally further include that the depth map includes one or more depth images received from one or more depth image sensors. The obstacle map generator may optionally further include that the determination of the first voxel position includes mapping the depth map to the voxel map based on one or more mapping parameters. The obstacle map generator may optionally further include that the one or more mapping parameters represent a field of view and a viewing direction associated with the depth map and the absolute position of the viewpoint. The obstacle map generator may optionally further include that the determination of the respective intermediate occupancy value is based on a predefined sequence of occupancy values.

According to various aspects, an obstacle map generator may be configured to receive a depth map, the depth map representing an obstacle in the real space and a depth value assigned to the obstacle, the depth value representing a distance of the obstacle from a viewpoint associated with the depth map, receive an absolute position of the viewpoint, generate an obstacle map (e.g. a voxel map) based on the depth map. The generation of the obstacle map (e.g. the voxel map) may include: determining a first voxel at a first voxel position that represents the obstacle, determining, based on the received absolute position of the viewpoint, a second voxel at a second voxel position that represents the viewpoint, determining a set of intermediate voxels at intermediate voxel positions between the first voxel position and the second voxel position, each voxel of the set of intermediate voxels intersecting with a single ray traced from the second voxel position to the first voxel position, assigning a first occupancy value to the first voxel, and assigning a second occupancy value to one or more voxels of the set of intermediate voxels, the first occupancy value representing a greater probability of the presence of an obstacle than the second occupancy value. According to another aspects, an obstacle map generator may be configured to generate an obstacle map from one or more depth images, the obstacle map including map positions representing absolute positions in the real space and the one or more depth images representing relative positions of one or more obstacles, determine from the one or more depth images one or more first map positions representing absolute positions of the one or more obstacles, determine a second map position associated with a viewpoint of the one or more depth images, determine, for each of the one or more first map positions, a set of intermediate map positions between the respective first map position and the second map position, each intermediate map position of the set of intermediate map positions intersecting with a single ray traced from the second map position to the respective first map position, assign a first occupancy value to the one or more first map position, the first occupancy value representing a first probability of the presence of the respective obstacle, and assign a second occupancy value to one or more intermediate map positions of the respectively determined set of intermediate map positions, the second occupancy value representing a second probability of the presence of an obstacle, wherein the second probability is less than the first probability. The respective obstacle map generator may include one or more processors or a computing system to carry out the respective functions associated with the generation of the obstacle map.

According to various aspects, a collision avoidance system may include an obstacle map generator as described herein, e.g. configured to generate an obstacle map (e.g. to generate a voxel map). The collision avoidance system may further include one or more processors configured to instruct a control of a vehicle based on the generated obstacle map (e.g. the generated voxel map). A collision avoidance system may include: one or more depth imaging sensors configured to provide a depth image of the vicinity of the one or more depth imaging sensors, the depth image including a plurality of pixels, wherein a depth value is assigned to each pixel of the plurality of pixels; and one or more processors configured to determine, from the depth image, one or more image objects associated with one or more obstacles in the vicinity of the one or more depth imaging sensors, each of the one or more image objects including one or more pixels and one or more depth values assigned to the one or more pixels, determine for each of the one or more image objects direction information and distance information, wherein the direction information represents a direction pointing from the one or more depth imaging sensors to the obstacle that correspond to the respective image object and wherein the distance information represents a distance to the obstacle along the direction, determine from the direction information and the distance information an absolute position of the obstacle and an absolute position of a viewpoint associated with the depth image based on positional information associated with the one or more depth imaging sensors, generate a voxel map, wherein the generation of the voxel map includes: determining one or more first voxels representing the absolute position of the obstacle, determining a second voxel representing the absolute position of the viewpoint, determining, for each of the one or more first voxels, a set of intermediate voxels between the respective first voxel and the second voxel, each voxel of the set of intermediate voxels intersecting with a single ray traced from the second voxel to the respective first voxel, assigning a first occupancy value to the one or more first voxels, the first occupancy value representing a probability of the presence of the obstacle, and assigning a second occupancy value to one or more intermediate voxels of the respectively determined set of intermediate voxels, the second occupancy value representing a probability of the presence of free space, and instruct a control of a vehicle based on the generated voxel map. According to another aspect, a collision avoidance system may include: one or more processors configured to generate a map from one or more depth images, the map including map positions representing absolute positions in the real space and the one or more depth images represents relative positions of one or more obstacles. The generation of the map may include: determining from the one or more depth images one or more first map positions representing absolute positions of the one or more obstacles, determining a second map position associated with a viewpoint of the one or more depth images, determining, for each of the one or more first map positions, a set of intermediate map positions between the respective first map position and the second map position, each intermediate map position of the set of intermediate map positions intersecting with a single ray traced from the second map position to the respective first map position, assigning a first occupancy value to the one or more first map position, the first occupancy value representing a probability of the presence of an obstacle, and assigning a second occupancy value to one or more intermediate map positions of the respectively determined set of intermediate map positions, the second occupancy value representing a probability of the presence of free space. The one or more processors may be further configured to instruct a control of a vehicle based on the generated map. According to another aspect, a collision avoidance system may include: one or more depth image sensors configured to receive depth information of the vicinity of the one or more depth image sensors and generate one or more depth images from the received depth information, the one or more depth images including at least one image object that represents an obstacle in the vicinity of the one or more depth image sensors and a depth value assigned to the at least one image object, the depth value representing a distance of the obstacle from the one or more depth image sensors; one or more processors configured to determine an absolute position of the one or more depth image sensors at the time of the reception of the depth information, generate a three-dimensional voxel map, determine, based on the one or more depth images, one or more first voxels at one or more first voxel positions that correspond to an absolute position of the obstacle, determine, based on the determined absolute position of the one or more depth image sensors, a second voxel at a second voxel position that represents the absolute position, determine, for each of the one or more first voxels, a set of intermediate voxels at intermediate voxel positions between the respective first voxel position and the second voxel position, each voxel of the set of intermediate voxels intersecting with a single ray traced from the second voxel position to the respective first voxel position, assign a first occupancy value to the one or more first voxels, the first occupancy value representing a probability of the presence of the obstacle, and assign a second occupancy value to one or more intermediate voxels of the respectively determined set of intermediate voxels, the second occupancy value representing a probability of the presence of free space.

According to various aspects, an obstacle map generator may include: one or more processors configured to generate a voxel map based on a depth map, and determine, for one or more voxel positions of the voxel map, an occupancy value, the respective occupancy value representing a probability of the presence of an obstacle at an absolute position corresponding to the respective voxel position. The obstacle map generator may optionally further include one or more memories. The one or more processors may be further configured to store, in the one or more memories, the determined occupancy value assigned to the corresponding voxel position in the voxel map. The determination of the respective occupancy value may include: determining a first voxel position representing the absolute position of the obstacle; determining a second voxel position representing an absolute position of a viewpoint associated with the depth map; determining one or more intermediate voxel positions between the first voxel position and the second voxel position; and determining an intermediate occupancy value for each of the one or more intermediate voxel positions, the respective intermediate occupancy value representing a probability of the presence of an obstacle at an absolute position corresponding to the intermediate voxel position. The generation of the voxel map may further include determining a first occupancy value for the first voxel position. The first occupancy value may represent a probability of the presence of the at least one obstacle at the absolute position of the at least one obstacle. The first occupancy value may represent a higher probability than the respective intermediate occupancy value. The determination of the one or more intermediate voxel position may include tracing a ray from the second voxel position to the first voxel position. Each voxel at the one or more intermediate voxel positions may intersect with the traced ray. The determination of the respective occupancy value may include summing up one or more occupancy values determined consecutively for the respective voxel position. The first occupancy value and the respective intermediate occupancy value may be in a range between a first boundary value and a second boundary value. The first boundary value may represent a definite presence of free space. The second boundary value may represent a definite presence of an obstacle. The respective occupancy value may be determined based on a measurement accuracy associated with the depth map. The depth map may include, may be generated based on one or more depth images received from one or more depth image sensors. The determination of the first voxel position may include mapping the depth map to the voxel map based on one or more mapping parameters. The one or more mapping parameters may represent a field of view and a viewing direction associated with the depth map and the absolute position of the viewpoint. The determination of the respective intermediate occupancy value may be based on a predefined function.

According to various aspects, the depth imaging system 200 may generate the modified depth image (see FIG. 2, as example). The modified depth image 210m may be used for the generation of a voxel map based on ray tracing, as described herein. Since the modified depth image 210m includes the one or more pixels having the pre-defined depth value 214p, these pixels may be used as target for the ray tracing algorithm. In contrast to invalid depth values of the depth image 220 that may be discarded, the one or more pixels having the pre-defined depth value 214p may allow the determination of the one or more intermediate voxel position by tracing a ray from a voxel position associated with the viewpoint; and/or the location of the depth imaging system 200; and/or the location of the drone) to a voxel position corresponding to the pixel position that has the pre-defined depth value 214p assigned thereto.

As an example, an obstacle may be represented by one or more voxels of a voxel map. These one or more voxels may be referred to as map object (see, for example, the map object 311c shown in the obstacle map 320 in FIG. 3), wherein the obstacle map is a voxel map. The one or more voxels representing the obstacle may have an occupancy value assigned thereto from a previously detected obstacle. In the case that the depth image 210 does not represent this previously detected obstacle anymore, the occupancy value may be reduced each time the corresponding one or more voxels representing the obstacle are determined to correspond to an obstacle free space, e.g. if the one or more voxels representing the obstacle are determined to be an intermediate voxel during the ray tracing algorithm.

FIG. 8 illustrates schematically a generation 800 of an obstacle map 320 based on the depth images, according to various aspects. The generation 800 of the obstacle map 320 may include adding 800a one or more map objects 811a, 811b to the obstacle map 320, the one or more map objects 811a, 811b representing one or more obstacles in a pre-defined area, e.g. in a vicinity of a vehicle. The generation 800 of the obstacle map 320 may further include modifying 800b (e.g. deleting, e.g. tagging, etc.) one or more map objects 811b that are included in the obstacle map 320.

As an example, the obstacle map 320 may include a first map object 811a and a second map object 811b being added to the obstacle map 320 based on a first depth image 810a. The first map object 811a may have a first map position Pa(i,j,k) assigned thereto. The second map object 811b may have a second map position Pb(i,j,k) assigned thereto. Each of the map positions Pa(i,j,k), Pb(i,j,k) may be correlated with a position in the real space determined from the first depth image 810a. Further, each of the map objects 811a, 811b may have an occupancy value La(i,j,k), Lb(i,j,k) assigned thereto. In some aspects, the respective confidence value La(i,j,k), Lb(i,j,k) represents a probability for the actual presence of the corresponding obstacle in the real space. The respective occupancy value La(i,j,k), Lb(i,j,k) may be set in accordance with a measurement and/or prediction accuracy, as described above with reference to the occupancy value that is used for a voxel map. According to various aspects, a voxel map may be used as the obstacle map 320, wherein the detected obstacles may be represented by an occupancy value that is respectively set for one or more voxels at voxel positions corresponding to the positions of the detected obstacles in the real space, as exemplarily described herein. However, other representations of the obstacles in a map, e.g. in a computer map, may be used in the same or in a similar way.

Further, the second map object 811b (only as an example) and/or the occupancy value Lb(i,j,k) assigned thereto may be modified 800m based on a second depth image 810b. The second depth image 810b may be shot after the first depth image 810a. According to various aspects, if the second depth image 810b may not include the obstacle corresponding to the second map object 811b, the occupancy value Lb(i,j,k) assigned thereto may be decreased. Alternatively, the second map object 811b may be deleted 800d from the obstacle map 320 if the second depth image 810b may not include the obstacle corresponding to the second map object 811b.

Further, the first map object 811a (as another example) and/or the occupancy value La(i,j,k) assigned thereto may be modified 800m based on a second depth image 810b. The second depth image 810b may be shot after the first depth image 810a. According to various aspects, if the second depth image 810b still includes the obstacle corresponding to the first map object 811a, the occupancy value La(i,j,k) assigned thereto may be increased.

According to various aspects, the respective occupancy value La(i,j,k), Lb(i,j,k) represents an occupation of the map position Pa(i,j,k), Pb(i,j,k) of the obstacle map 320. The respective occupancy value La(i,j,k), Lb(i,j,k) may be increased based on valid pixels from the depth images, e.g. based on the determined first (valid) set of pixels. The respective occupancy value La(i,j,k), Lb(i,j,k) may be decreased based on invalid pixels from the depth images, e.g. based on the one or more pixels of the second set of pixels having the pre-defined depth value assigned thereto.

As described herein, the one or more pixels of the second set of pixels that are not invalid anymore but have instead the pre-defined depth value assigned thereto may be used as target in the ray tracing algorithm for generating the voxel map (e.g. as shown in FIGS. 6A to 7B). In other words, the generation of the obstacle map may include: determining a first map position (see map position P2($i,j,k$) in FIGS. 6A to 7B) representing an absolute position of the depth imaging system 200, determining one or more second map positions (see map position P1($i,j,k$) in FIGS. 6A to 7B) representing one or more absolute positions represented by the one or more pixels of the second set of pixels having the pre-defined depth value assigned thereto, determining one or more intermediate map positions (see map position Pi(i,j,k) in FIGS. 6A to 7B) between the first map position and each of the one or more second map position, and determining an intermediate occupancy value (see intermediate occupancy value Li(i,j,k) in FIG. 7A) for each of the one or more intermediate map positions, the respective intermediate occupancy value representing a probability of presence of an obstacle at an absolute position corresponding to the intermediate map position.

Further, the generation of the obstacle map may include: determining from the one or more pixels of the first set of pixels one or more third map positions (see map positions Pa(i,j,k), Pb(i,j,k)) representing one or more absolute positions of one or more obstacles in a vicinity of the depth imaging system, determining an occupancy value for each of the one or more third map position, the determined occupancy value representing a probability of presence of at least one obstacle at an absolute position corresponding to the respective third map position.

As described herein, the obstacle map 320 may be a voxel map, the first map position may be a first voxel position, the one or more second map positions may be one or more second voxel positions, and the one or more intermediate map positions may be one or more intermediate voxel positions. The determination of the one or more intermediate voxel positions may include tracing a ray from the first voxel position to each of the one or more second voxel position, wherein each voxel at the one or more intermediate voxel positions intersect with the traced ray.

According to various aspects, the generation of the obstacle map 320 may further include: determining one or more intermediate map positions between the first map position and each of the one or more third map position, and determining an occupancy value for each of the one or more intermediate map positions, the respective intermediate occupancy value representing a probability of presence of an obstacle at an absolute position corresponding to the intermediate map position.

Further, in the case that the obstacle map is a voxel map, the one or more third map positions may be one or more third voxel positions. The determination of the one or more intermediate voxel positions may include tracing a ray from the first voxel position to each of the one or more third voxel position, wherein each voxel at the one or more intermediate voxel positions intersect with the traced ray.

According to various aspects, each pixel of the depth images that has no depth value assigned thereto or that has a depth value outside a predefined depth value range assigned thereto may be part of the second (invalid) set of pixels. Without any additional measures, the image area 813, for example, may not have any valid depth values assigned thereto in the case that the obstacle that corresponds to the second map object 811*b* is not present anymore in the real space. Therefore, the pixels of the image area 813 may be determined, in this case, to be part of the second (invalid) set of pixels.

Without any additional measures, the image area 813 may not contribute to the generation of the obstacle map 320, since it may only include invalid depth values, e.g. depth values above a predefined threshold or no depth value at all. Therefore, without any additional measures, various image areas of the depth images may not allow to detect whether an obstacle disappeared, e.g. a moving obstacle, and therefore, the obstacles map 320 may include map objects that may have no corresponding obstacle in the real space. Therefore, a pre-defined depth value may be assigned to one or more pixels of the second set of pixels. With this additional measure, one or more pixels 813*p* of the image area 813 may have illustratively a valid (the predefined) depth value assigned thereto and may therefore contribute to the generation (or in other words modification) of the obstacle map 320. This allows for a deletion of the second map object 811*b* from the obstacle map in the case that the obstacle that corresponds to the second map object 811*b* is not present anymore at the corresponding position in the real space. Instead of deleting the second map object 811*b* immediately the occupancy value Lb(i,j,k) assigned to the second map object 811*b* may be reduced 800*m* in the case that the obstacle that corresponds to the second map object 811*b* is not present anymore at the corresponding position in the real space.

In the following, one or more aspects are described wherein depth sensors may be used to provide depth images that are converted into a voxel-based map of the area in which a drone (or any other vehicle) shall be operated.

Figure 9A:
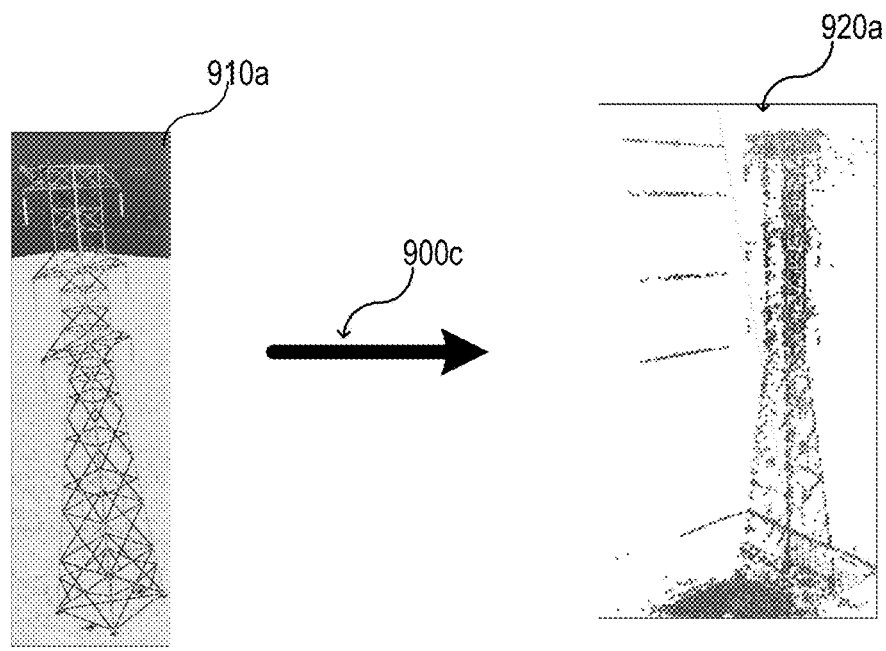
FIG. 9A and FIG. 9B show exemplarily two scenes that are converted into a corresponding voxel maps, according to various aspects.
Figure 9B:
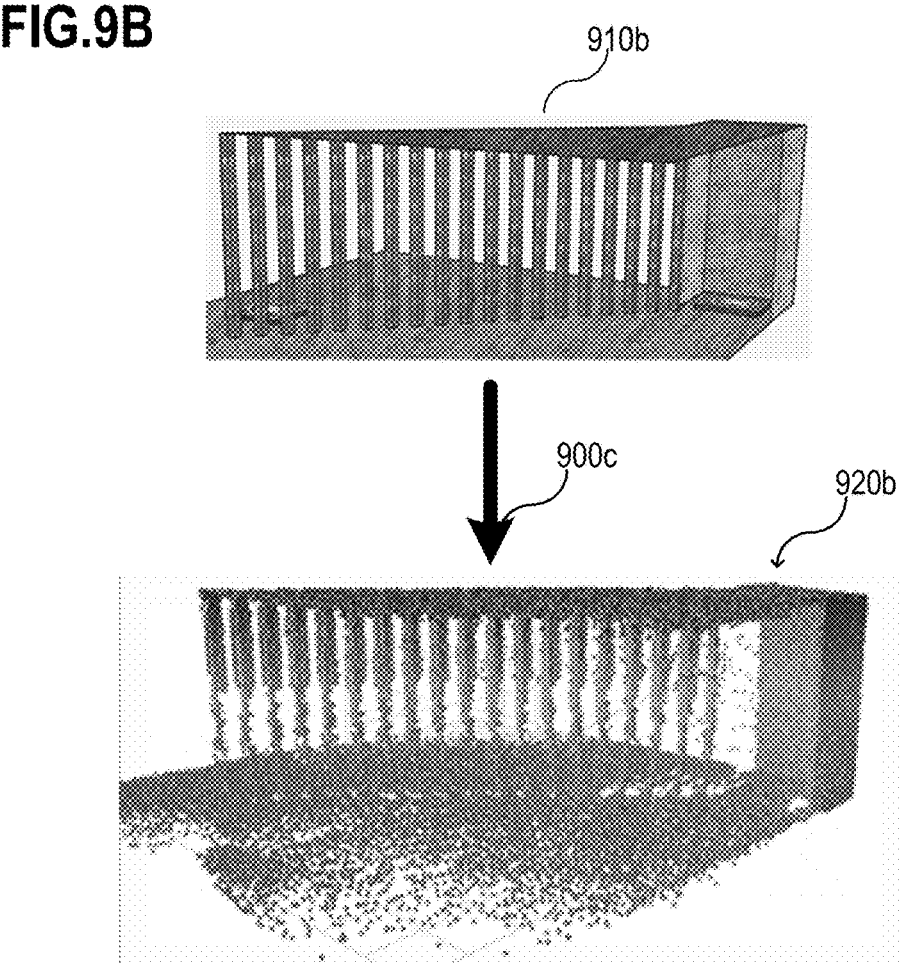

FIG. 9A and FIG. 9B show exemplarily two scenes 910*a*, 910*b* that are converted (in 900*c*) into a corresponding voxel maps 920*a*, 920*b*, according to various aspects. The respective scenes may include static objects that can be detected as obstacles and added to the voxel maps 920*a*, 920*b*.

Figure 10A:
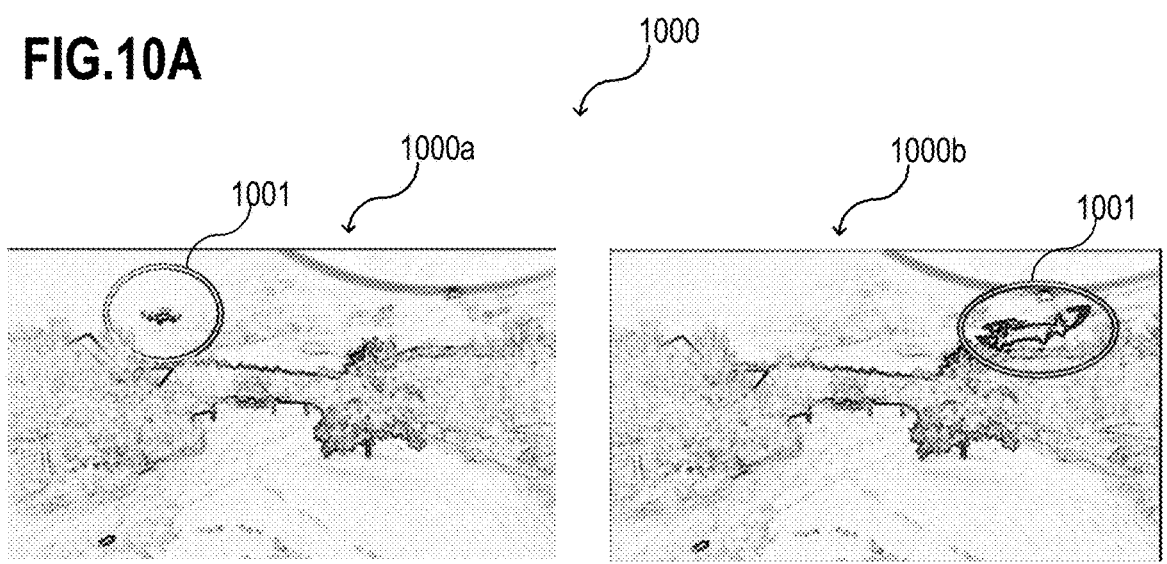
FIG. 10A shows exemplarily a depth camera view of a dynamic object at a different times, according to various aspects.

FIG. 10A shows exemplarily a depth camera view 1000 of a dynamic object 1001 (e.g. another drone, a bird, etc.) at a first time 1000*a* and at a second time 1000*b*. In the following, various aspects are described with respect to the generation of a voxel map of the vicinity of a drone when the dynamic object 1001 is moving within the field of view of the depth imaging system of the drone.

Figure 10B:
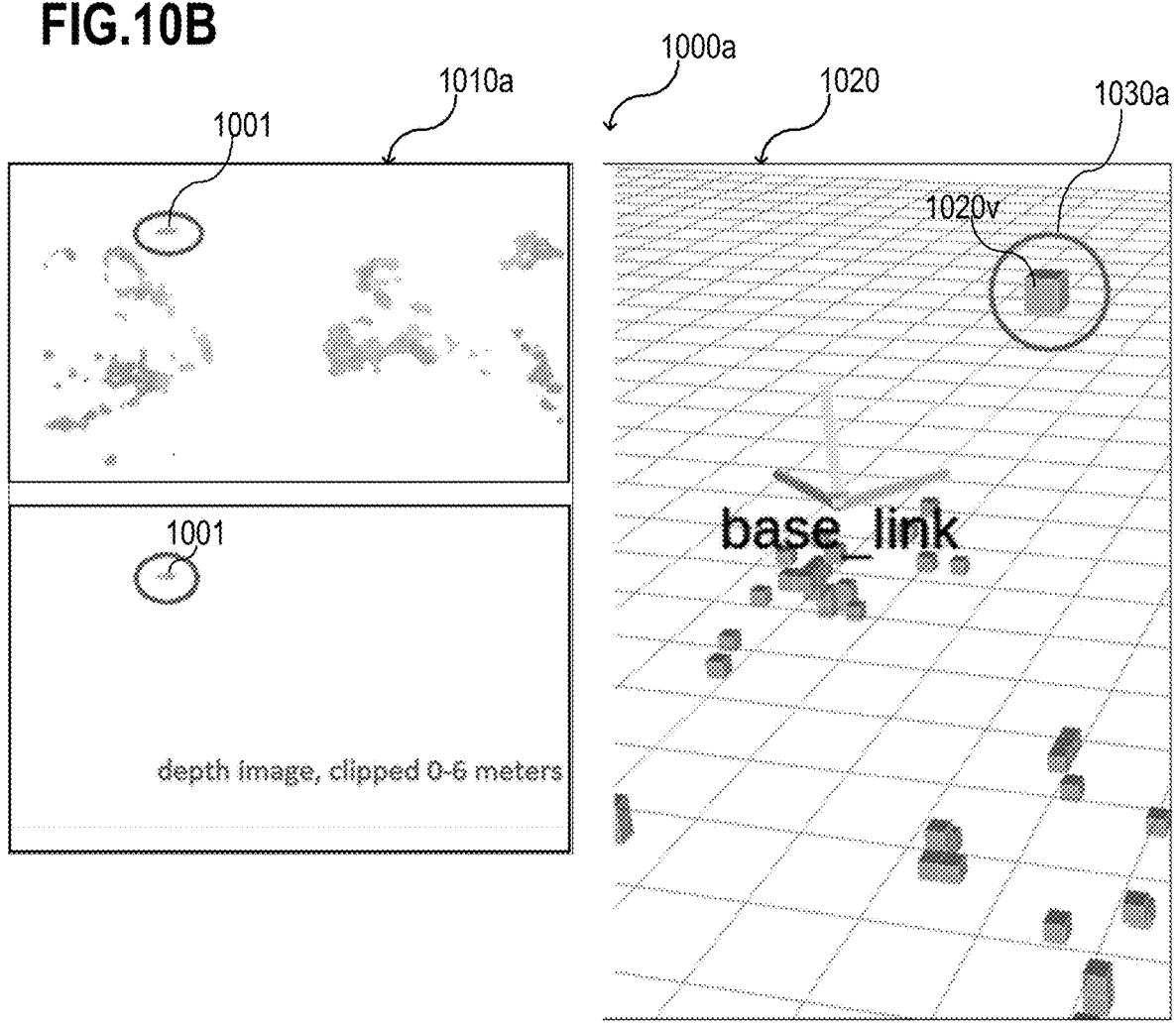
FIG. 10B shows exemplarily a detection of a dynamic object at a first time and a generation of a voxel map based thereon, according to various aspects.

FIG. 10B shows exemplarily a detection of the dynamic object 1001 at the first time 1000*a* and the generation of a voxel map 1020 based thereon. According to various aspects, the dynamic object 1001 may be detected at the first time 1000*a* via the depth imaging system that provides a depth image 1010*a* accordingly. Based thereon, the corresponding position of the dynamic object 1001 in the real world may be determined and the voxel map 1020 may be updated, e.g. a corresponding map object 1030*a* may be generated in the voxel map 1020. In some aspects, the map object 1030*a* may include an occupancy value assigned to at least one voxel 1020*v* of the voxel map 1020 at a voxel position that corresponds to the position of the dynamic object 1001 at the first time 1000*a* in the real space. That area in the real space that corresponds to the map object 1030*a* may be considered as occupied by an obstacle and, therefore, a collision may be avoided.

Figure 10C:
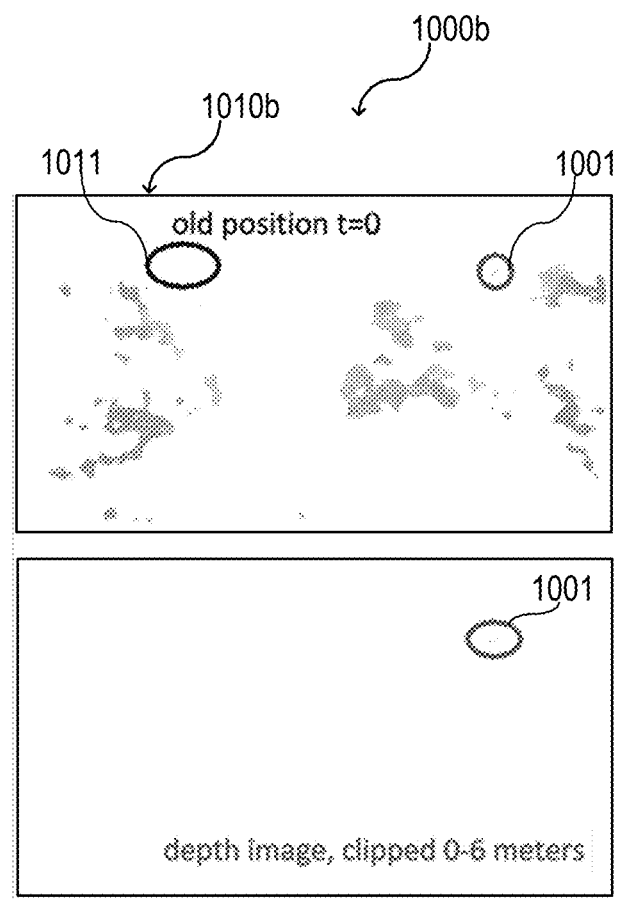
FIG. 10C shows exemplarily a detection of a dynamic object at a second time and a modification of a voxel map based thereon, according to various aspects.

FIG. 10C shows exemplarily the detection of the dynamic object 1001 at the second time 1000*b*. According to various aspects, the dynamic object 1001 may be detected at the second time 1000*b* via the depth imaging system that provides a depth image 1010*b* accordingly. Compared to the first time, the dynamic object 1001 has moved and therefore changed its position in the real space. Based on the depth image 1010*b*, the corresponding actual position of the dynamic object 1001 in the real world may be determined and the voxel map 1020 may be updated, e.g. a corresponding map object may be generated in the voxel map 1020, as described with reference to FIG. 10B. However, as the region 1011 that the dynamic object 1001 has occupied before (e.g. at the first time 1000*a*) is now cleared, the previously added map object 1030*a* may be removed from the voxel map.

However, the depth sensors of the depth imaging system that may be used to generate the depth images 1010*a*, 1010*b*, may have limits (e.g. in the detection range, etc.). Therefore, at least some pixels of the respective depth image 1010*a*, 1010*b* may have no depth value (or at least no valid depth value) assigned thereto. As an example, a depth value of zero may be used in the depth images to indicate that the depth value at this image region (e.g. including one or more pixels) is invalid.

In some aspects, the white areas of the depth images (see, for example, the top portion of FIG. 10C may represent INVALID depth values. This means, no information may be obtained from the white areas for generating the obstacles map (e.g. the voxel map 1020). As shown in FIG. 10C, at the "old" position (at the first time 1000*a*) of the dynamic object 1001 only invalid depth values may be available. If there would be a valid depth value indicating that the next object is, for example, 30 meters away, the obstacle map could be updated accordingly, but this way, the old and now invalid obstacle will remain represented in the obstacle map.

In some aspects, a global "forget" function may be used to delete "old" entries from the obstacle map, e.g. after a predefined time. However, such a global forget function may not be desired, since, for example, static obstacles (e.g. a tree, a building, etc.) would be deleted as well and the drone could collide with such obstacles when no depth cameras are available and the obstacle avoidance function may not work properly. Illustratively, in the case that at some arbitrary time (e.g. after two minutes) these static obstacles may be removed from the obstacle map, wrong expectations of the pilot of the drone may lead to a crash. Further, for fast moving objects like other drones, birds, etc., two minutes, for example, may be too long, as objects could block the path for continuing the flight for this time (e.g. two minutes may be 5% to 15% of the battery life of a drone).

According to various aspects, a selective forget functionality is described herein. The selective forget functionality may be used to generate (e.g. update) occupancy values of a voxel map. However, other maps may be updated in a similar way. The selective forget functionality may include of two aspects:

First; only map data that are currently within the field of view of the depth sensors are considered to be modified by the selective forget function; and Second; a randomizer may change only a fraction (e.g. less than 10%, less than 5%, or less than 1%) of the invalid depth values in a current depth image to a value that indicates that in this direction there is a free space. As an example, a fraction of the invalid depth values in a depth image are set to the value to 20 meters or greater.

According to various aspects, an algorithm of the selective forget functionality may be as follows:

```
foreach(depthImage){
    foreach(depthValue in the depthImage){
        if(depthValue == INVALID){
            if(randomValueMatchesCertainNumber( )){
                depthValue = 20 meters;
            }
        }
    }
}
```

The function "randomValueMatchesCertainNumber( )" may, for example, return true in a randomized way with an average of about once in 200 calls of the function. This may on purpose reduce the percentage of voxels to forget compared to brute-force forgetting all within the camera view with invalid depth values. According to various aspects, the rate of forgetting voxels may be limited to reduce a risk of losing valid map data.

The selective forget functionality may be implemented in a depth imaging system (e.g. in the depth imaging system 200 described herein) and/or an obstacle map generator (e.g. the obstacle map generator 300 described herein).

According to various aspects, the depth images generated by the depth imaging system (e.g. by the depth imaging system 200) may be modified directly which may guarantee that only data that is currently within the field of view of the depth imaging system is modified. That way, the situation of flying, for example, backwards with no sensors to a previously observed object without causing a collision can still be executed.

Further, as the selective forget functionality only changes invalid depth values, but not any valid ones, any valid obstacle will still be entered in the map. This may automatically scale in a way that if many valid depth values are available, only very few data will be artificially forgotten by the algorithms. The other way around it may scale as well. If many invalid depth values are present, more data is forgotten since no other reliable data are available.

The term "forget" as referred to herein may include, for example, either fully destroying a voxel, which has previously been set to occupied, or decreasing a confidence value for occupation. For example, an entry may need to be randomly forgotten four times before it us actually deleted from the map.

Alternatively, instead of the randomizer, other functions may be used to choose which invalid depth value in the depth image is modified. For example, the depth image may be split into sectors (e.g. 16×12) and in each of those sectors in one instance the first depth value is modified, in the next run the second depth value, and so on.

Figure 11:
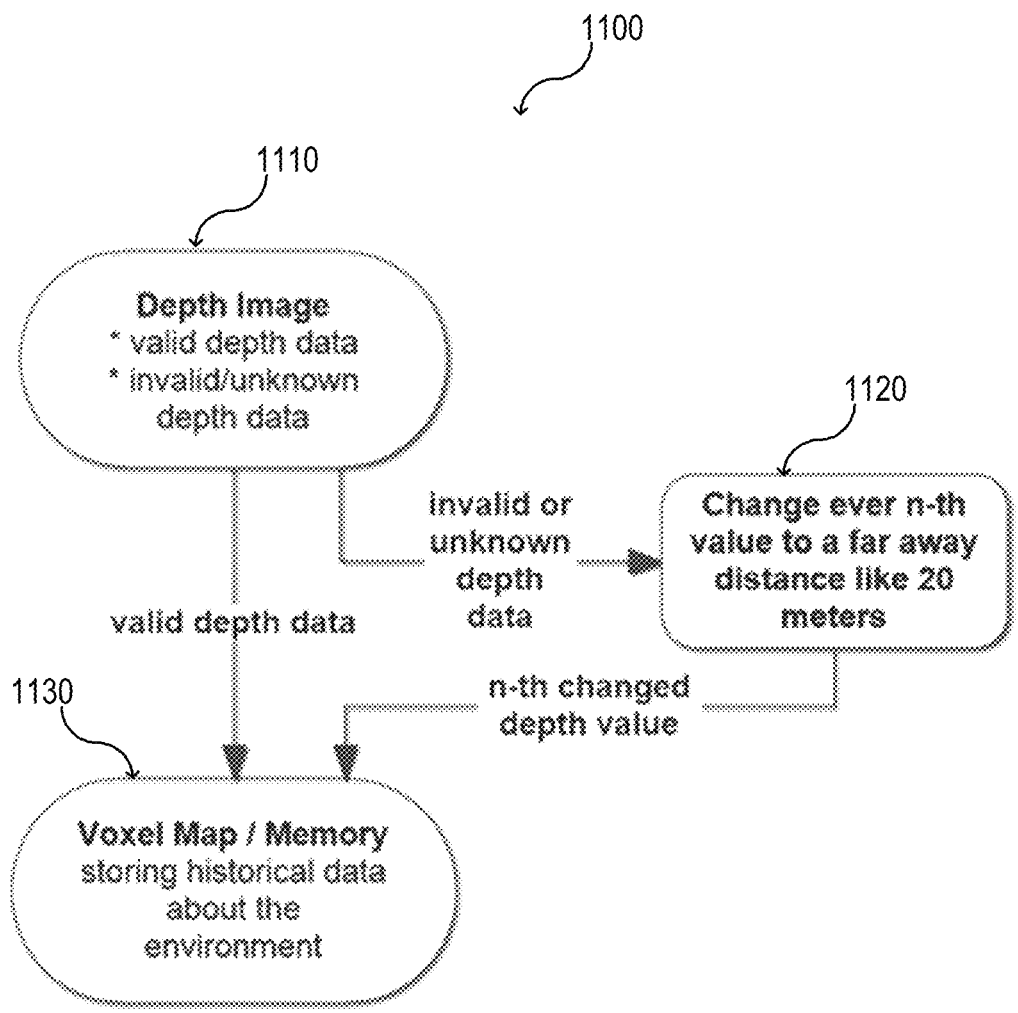
FIG. 11 shows a schematic flow diagram of a selective forget function, according to various aspects.

FIG. 11 shows a schematic flow diagram of a selective forget function 1100, according to various aspects. According to various aspects, valid depth data and invalid/unknown depth data may be determined from the depth image, e.g. in 1110. For the invalid/unknown depth data, every n-th depth value may be set to a predefined depth value, in 1120. The predefined depth value may be, for example, 20 meters. Finally, e.g. in 1130, a voxel map may be generated based on the valid depth data and the changed depth values. Illustratively, historical data are stored representing information of a vicinity of a drone.

According to various aspects, a depth imaging system may include one or more depth imaging sensors configured to generate a depth image and one or more processors configured to determine, for each depth value of the generated depth image, whether the depth value is within a predefined depth value range, and randomly replace the determined depth value with a pre-defined depth value in the case that the depth value is within the predefined depth value range.

Figure 12:
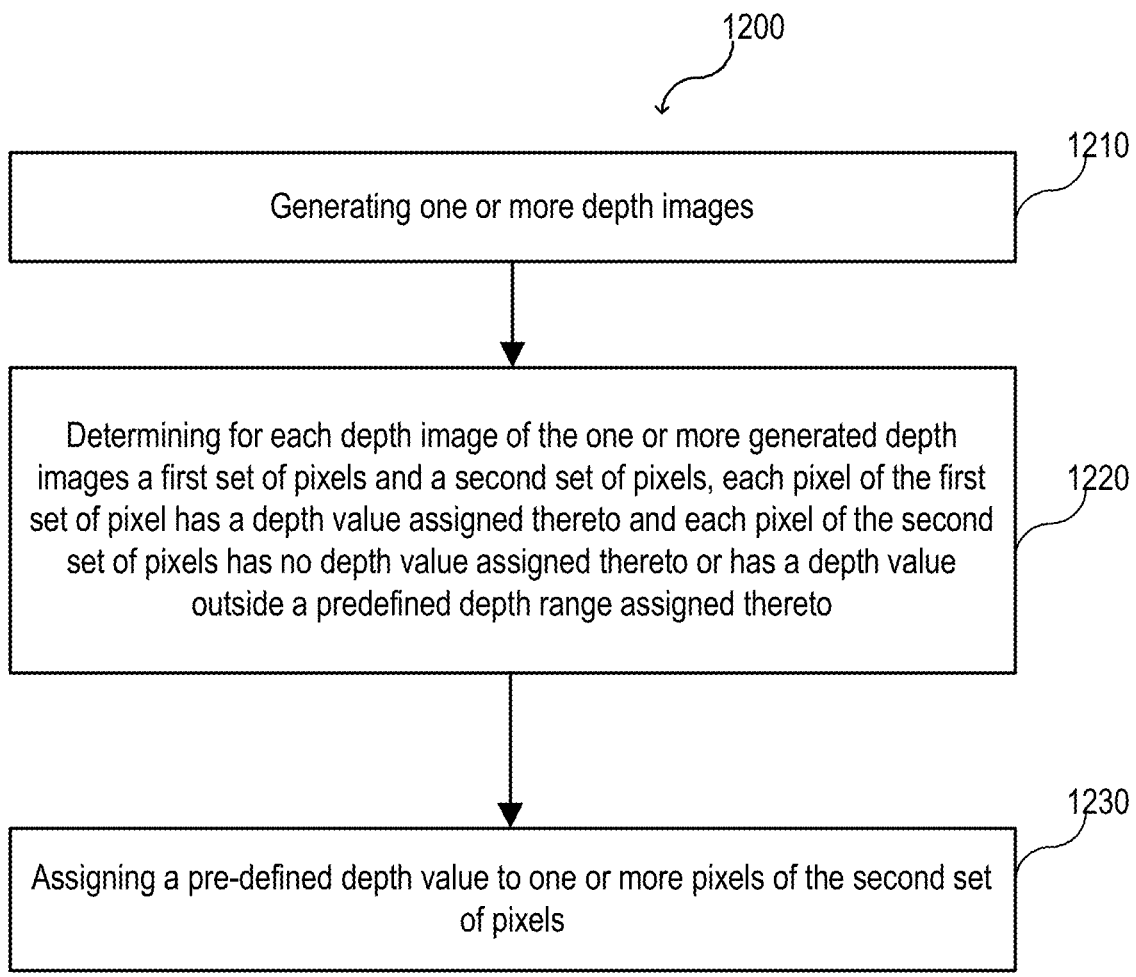
FIG. 12 shows a schematic flow diagram of a method for operating a depth imaging system, according to various aspects.

FIG. 12 shows a schematic flow diagram of a method 1200 for operating a depth imaging system (e.g. the depth imaging system 200 as illustrated in FIG. 2), according to various aspects. The method 1200 for operating the depth imaging system may include: in 1210, generating one or more depth images; in 1220, determining for each depth image of the one or more generated depth images a first (e.g. valid) set of pixels and a second (e.g. invalid) set of pixels, each pixel of the first set of pixel has a depth value assigned thereto and each pixel of the second set of pixels has no depth value assigned thereto or has a depth value outside a predefined depth value range assigned thereto; and, in 1230, assigning a pre-defined depth value to one or more pixels of the second set of pixels. In 1230, a modified depth image is generated, the modified depth image including at least the first set of pixels and the one or more pixels of the second set of pixels having the pre-defined depth value assigned thereto.

In a similar way, a method for operating a collision avoidance system may include: generating one or more depth images from a vicinity of the depth imaging system; determining for each depth image of the one or more generated depth images a first (e.g. valid) set of pixels and a second (e.g. invalid) set of pixels, each pixel of the first set of pixel has a depth value assigned thereto and each pixel of the second set of pixels has no depth value assigned thereto or has a depth value outside a predefined depth value range assigned thereto; and assigning a pre-defined depth value to one or more pixels of the second set of pixels.

Figure 13:
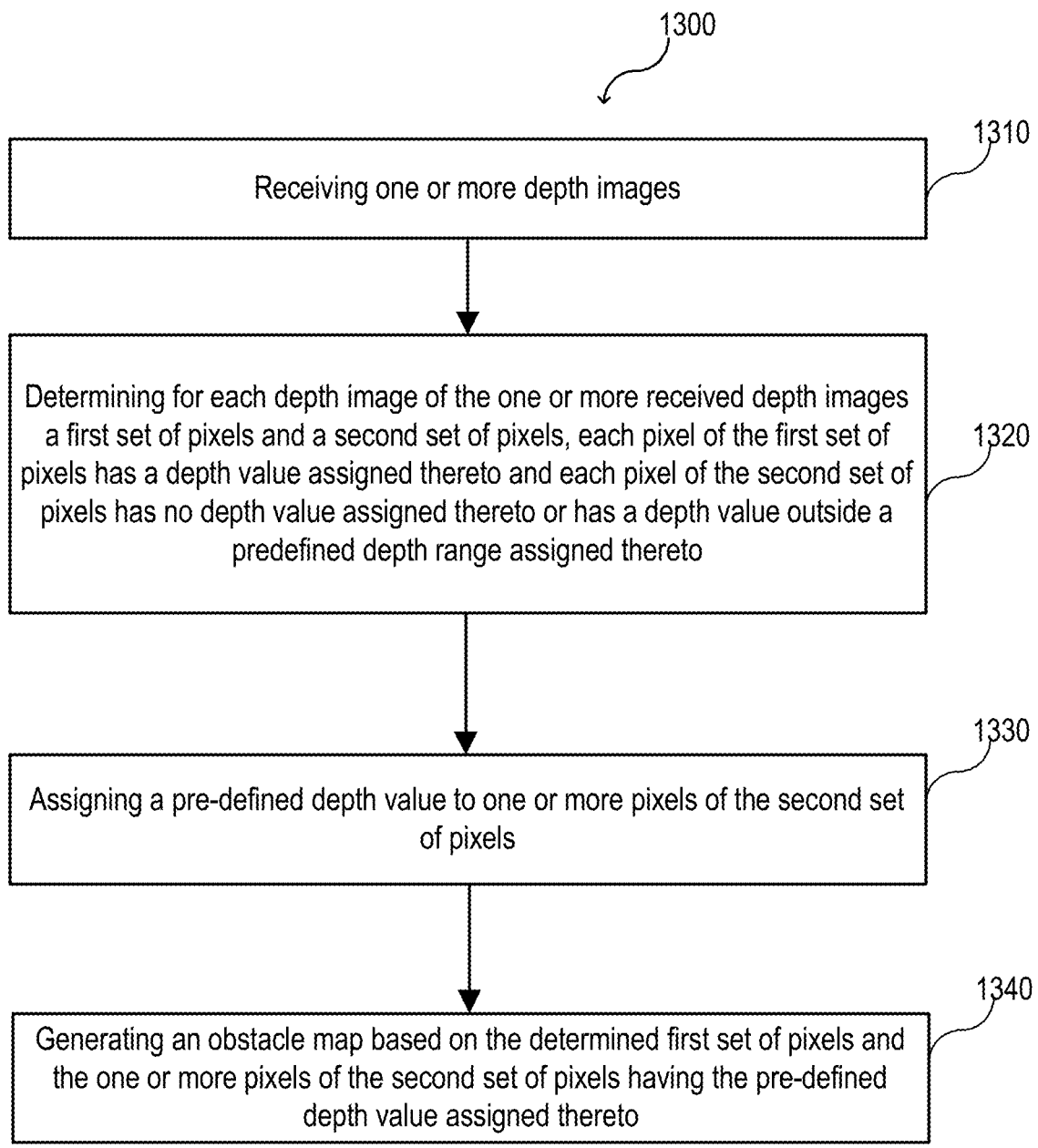
FIG. 13 shows a schematic flow diagram of a method for operating an obstacle map generator, according to various aspects.

FIG. 13 shows a schematic flow diagram of a method 1300 for operating an obstacle map generator (e.g. the obstacle map generator 300 as illustrated in FIG. 3), according to various aspects. The method 1300 may be a method for generating an obstacle map, according to various aspects. The method 1300 for operating the obstacle map generator may include: in 1310, receiving one or more depth images; in 1320, determining for each depth image of the one or more received depth images a first (e.g. valid) set of pixels and a second (e.g. invalid) set of pixels, each pixel of the first set of pixels has a depth value assigned thereto and each pixel of the second set of pixels has no depth value assigned thereto or has a depth value outside a predefined depth value range assigned thereto; in 1330, assigning a pre-defined depth value to one or more pixels of the second set of pixels; and, in 1340, generating an obstacle map based on the determined first set of pixels and the one or more pixels of the second set of pixels having the pre-defined depth value assigned thereto. The obstacle map may include a voxel map. However, any other suitable form of storing the depth data may be used in a similar way.

In the following, various examples are described that may refer to one or more aspects described above, e.g. to one or more aspects of the unmanned aerial vehicle 100 (or any other a least partially autonomously controlled vehicle), the depth imaging system 200 and/or the obstacle map generator 300 described above.

Example 1 is an obstacle map generator, including: one or more processors configured to receive one or more depth images from a depth imaging system, determine, for each depth image of the one or more received depth images, a first set of pixels and a second set of pixels, each pixel of the first set of pixels has a depth value assigned thereto and each pixel of the second set of pixels has no depth value assigned thereto or has a depth value outside a predefined depth value range assigned thereto, assign a pre-defined depth value to one or more pixels of the second set of pixels, and generate an obstacle map based on the determined first set of pixels and the one or more pixels of the second set of pixels having the pre-defined depth value assigned thereto.

In example 2, the obstacle map generator of example 1 may further include that the depth value assigned to a corresponding pixel of the first set of pixel represents a distance of an obstacle from the depth imaging system.

In example 3, the obstacle map generator of example 1 or 2 may further include that the pre-defined depth value represents a maximal measurement distance of the depth imaging system.

In example 4, the obstacle map generator of any one of examples 1 to 3 may further include that the one or more processors are further configured to cease using, for the generation of the obstacle map, pixels of the second set of pixels having not the pre-defined depth value assigned thereto.

In example 5, the obstacle map generator of any one of examples 1 to 4 may further include that the generation of the obstacle map includes generating map objects representing obstacles in a vicinity of the depth imaging system based on the determined first set of pixels.

In example 6, the obstacle map generator of any one of examples 1 to 5 may further include that the generation of the obstacle map includes deleting one or more map objects representing obstacles in a vicinity of the depth imaging system based on the one or more pixels of the second set of pixels having the pre-defined depth value assigned thereto.

In example 7, the obstacle map generator of any one of examples 1 to 6 may further include that the generation of the obstacle map includes determining, based on the determined first set of pixel, an occupancy value assigned to a map position of the obstacle map, the occupancy value representing a probability of presence of an obstacle at an absolute position corresponding to the map position.

In example 8, the obstacle map generator of any one of examples 1 to 7 may further include that the generation of the obstacle map includes, for one or more map positions of the obstacle map, decreasing an occupancy value assigned to a map position of the obstacle map based on the one or more pixels of the second set of pixels having the pre-defined depth value assigned thereto, the occupancy value representing a probability of presence of an obstacle at an absolute position corresponding to the map position.

In example 9, the obstacle map generator of any one of examples 1 to 7 may further include that the generation of the obstacle map includes: determining a first map position representing an absolute position of the depth imaging system, determining one or more second map positions representing one or more absolute positions represented by the one or more pixels of the second set of pixels having the pre-defined depth value assigned thereto, determining one or more intermediate map positions between the first map position and each of the one or more second map position, and determining an occupancy value for each of the one or more intermediate map positions, the respective intermediate occupancy value representing a probability of presence of an obstacle at an absolute position corresponding to the intermediate map position.

In example 10, the obstacle map generator of example 9 may further include that the generation of the obstacle map further includes: determining from the one or more pixels of the first set of pixels one or more third map positions representing one or more absolute positions of one or more obstacles in a vicinity of the depth imaging system, determining an occupancy value for each of the one or more third map position, the determined occupancy value representing a probability of presence of at least one obstacle at an absolute position corresponding to the respective third map position.

In example 11, the obstacle map generator of example 9 or 10 may further include that obstacle map is a voxel map, the first map position is a first voxel position, the one or more second map positions are one or more second voxel positions, the one or more intermediate map positions are one or more intermediate voxel positions.

In example 12, the obstacle map generator of example 11 may further include that the determination of the one or more intermediate voxel positions includes tracing a ray from the first voxel position to each of the one or more second voxel position, wherein each voxel at the one or more intermediate voxel positions intersect with the traced ray.

In example 13, the obstacle map generator of example 10 may further include that the generation of the obstacle map further includes: determining one or more intermediate map positions between the first map position and each of the one or more third map position, and determining an occupancy value for each of the one or more intermediate map positions, the respective intermediate occupancy value representing a probability of presence of an obstacle at an absolute position corresponding to the intermediate map position.

In example 14, the obstacle map generator of example 13 may further include that obstacle map is a voxel map, the first map position is a first voxel position, the one or more third map positions are one or more third voxel positions, the one or more intermediate map positions are one or more intermediate voxel positions.

In example 15, the obstacle map generator of example 14 may further include that the determination of the one or more intermediate voxel positions includes tracing a ray from the first voxel position to each of the one or more third voxel position, wherein each voxel at the one or more intermediate voxel positions intersect with the traced ray.

In example 16, the obstacle map generator of any one of examples 1 to 15 may further include that the one or more processors are further configured to select the one or more pixels for the assignment of the pre-defined depth value thereto randomly from the second set of pixels.

In example 17, the obstacle map generator of example 16 may further include that a fraction of 0.1% to 10% of a total number of pixels is selected from the second set of pixels for the assignment of the pre-defined depth value thereto.

Example 18 is a collision avoidance system, including: a depth imaging system configured to generate one or more depth images; and an obstacle map generator according to any one of examples 1 to 17 to generate an obstacle map based on the generated depth images.

Example 19 is a collision avoidance system, including: a depth imaging system configured to generate one or more depth images from a vicinity of the depth imaging system; and one or more processors configured to determine for each depth image a first set of pixels and a second set of pixels, each pixel of the first set of pixel has a depth value assigned thereto and each pixel of the second set of pixels has no depth value assigned thereto or has a depth value outside a predefined depth value range assigned thereto, and assign a pre-defined depth value to one or more pixels of the second set of pixels.

In example 20, the collision avoidance system of example 19 may further include that the depth value assigned to a corresponding pixel of the first set of pixel represents a distance of an obstacle from the depth imaging system.

In example 21, the collision avoidance system of example 19 or 20 may further include that the pre-defined depth value represents a maximal measurement distance of the depth imaging system.

In example 22, the collision avoidance system of any one of examples 19 to 21 may further include that the one or more processors are further configured to discard pixels of the second set of pixels having not the pre-defined depth value assigned thereto.

In example 23, the collision avoidance system of any one of examples 19 to 22 may further include that the one or more processors are further configured to select the one or more pixels for the assignment of the pre-defined depth value thereto randomly from the second set of pixels.

In example 24, the collision avoidance system of example 23 may further include that a fraction of 0.1% to 10% of a total number of pixels is selected from the second set of pixels for the assignment of the pre-defined depth value thereto.

Example 25 is a vehicle including a collision avoidance system of any one of examples 18 to 24 to avoid collision of the vehicle with one or more obstacles in a vicinity of the vehicle.

Example 26 is a depth imaging system, including: one or more depth imaging sensors configured to generate one or more depth images; and one or more processors configured to determine, for each depth image of the one or more depth images, a first set of pixels and a second set of pixels, each pixel of the first set of pixel has a depth value assigned thereto and each pixel of the second set of pixels has no depth value assigned thereto or has a depth value outside a predefined depth value range assigned thereto, assign a pre-defined depth value to one or more pixels of the second set of pixels to generate a modified depth image, the modified depth image including at least the first set of pixels and the one or more pixels of the second set of pixels having the pre-defined depth value assigned thereto.

In example 27, the depth imaging system of example 26 may further include that the depth value assigned to a corresponding pixel of the first set of pixel represents a distance of an obstacle from the depth imaging system.

In example 28, the depth imaging system of example 26 or 27 may further include that the pre-defined depth value represents a maximal measurement distance of the depth imaging system.

In example 29, the depth imaging system of any one of examples 26 to 28 may further include that the one or more processors are further configured to discard pixels of the second set of pixels having not the pre-defined depth value assigned thereto.

In example 30, the depth imaging system of any one of examples 26 to 29 may further include that the one or more processors are further configured to select the one or more pixels for the assignment of the pre-defined depth value thereto randomly from the second set of pixels.

In example 31, the depth imaging system of example 30 may further include that a fraction of 0.1% to 10% of a total number of pixels is selected from the second set of pixels for the assignment of the pre-defined depth value thereto.

Example 32 is a method for generating an obstacle map, the method including: receiving one or more depth images from a depth imaging system; determining, for each depth image of the one or more received depth images, a first set of pixels and a second set of pixels, each pixel of the first set of pixels has a depth value assigned thereto and each pixel of the second set of pixels has no depth value assigned thereto or has a depth value outside a predefined depth value range assigned thereto; assigning a pre-defined depth value to one or more pixels of the second set of pixels; and generating an obstacle map based on the determined first set of pixels and the one or more pixels of the second set of pixels having the pre-defined depth value assigned thereto.

In example 33, the method of example 32 may further include that the depth value assigned to a corresponding pixel of the first set of pixel represents a distance of an obstacle from the depth imaging system.

In example 34, the method of example 32 or 22 may further include that the pre-defined depth value represents a maximal measurement distance of the depth imaging system.

In example 35, the method of any one of examples 32 to 34, further including: ceasing to use pixels of the second set of pixels having not the pre-defined depth value assigned thereto for the generation of the obstacle map.

In example 36, the method of any one of examples 32 to 35 may further include that generating the obstacle map includes generating map objects representing obstacles in a vicinity of the depth imaging system based on the determined first set of pixels.

In example 37, the method of any one of examples 32 to 36 may further include that generating the obstacle map includes deleting one or more map objects representing obstacles in a vicinity of the depth imaging system based on the one or more pixels of the second set of pixels having the pre-defined depth value assigned thereto.

In example 38, the method of any one of examples 32 to 37 may further include that generating the obstacle map includes increasing an occupancy value representing an occupation of a map position of the obstacle map based on the determined first set of pixels.

In example 39, the method of any one of examples 32 to 38 may further include that generating the obstacle map includes, for one or more map positions of the obstacle map, decreasing an occupancy value representing an occupation of the one or more map positions based on the one or more pixels of the second set of pixels having the pre-defined depth value assigned thereto.

In example 40, the method of any one of examples 32 to 38 may further include that generating the obstacle map includes: determining a first map position representing an absolute position of the depth imaging system, determining one or more second map positions representing one or more absolute positions represented by the one or more pixels of the second set of pixels having the pre-defined depth value assigned thereto, determining one or more intermediate map positions between the first map position and each of the one or more second map position, and determining an occupancy value for each of the one or more intermediate map positions, the respective intermediate occupancy value representing a probability of presence of an obstacle at an absolute position corresponding to the intermediate map position.

In example 41, the method of example 40 may further include that generating the obstacle map further includes: determining from the one or more pixels of the first set of pixels one or more third map positions representing one or more absolute positions of one or more obstacles in a vicinity of the depth imaging system, determining an occupancy value for each of the one or more third map position, the determined occupancy value representing a probability of presence of at least one obstacle at an absolute position corresponding to the respective third map position.

In example 42, the method of example 40 or 41 may further include that obstacle map is a voxel map, the first map position is a first voxel position, the one or more second map positions are one or more second voxel positions, the one or more intermediate map positions are one or more intermediate voxel positions.

In example 43, the method of example 42 may further include that determining the one or more intermediate voxel positions includes tracing a ray from the first voxel position to each of the one or more second voxel position, wherein each voxel at the one or more intermediate voxel positions intersect with the traced ray.

In example 44, the method of example 41 may further include that generating the obstacle map further includes: determining one or more intermediate map positions between the first map position and each of the one or more third map position, and determining an occupancy value for each of the one or more intermediate map positions, the respective intermediate occupancy value representing a probability of presence of an obstacle at an absolute position corresponding to the intermediate map position.

In example 45, the method of example 44 may further include that obstacle map is a voxel map, the first map position is a first voxel position, the one or more third map positions are one or more third voxel positions, the one or more intermediate map positions are one or more intermediate voxel positions.

In example 46, the method of example 45 may further include that determining the one or more intermediate voxel positions includes tracing a ray from the first voxel position to each of the one or more third voxel position, wherein each voxel at the one or more intermediate voxel positions intersect with the traced ray.

In example 47, the method of any one of examples 32 to 15, further including: selecting the one or more pixels for the assignment of the pre-defined depth value thereto randomly from the second set of pixels.

In example 48, the method of example 47 may further include that a fraction of 0.1% to 10% of a total number of pixels is selected from the second set of pixels for the assignment of the pre-defined depth value thereto.

Example 49 is a method for operating a collision avoidance system, the method including: generating one or more depth images from a vicinity of the depth imaging system; determining, for each depth image of the one or more generated depth images, a first set of pixels and a second set of pixels, each pixel of the first set of pixel has a depth value assigned thereto and each pixel of the second set of pixels has no depth value assigned thereto or has a depth value outside a predefined depth value range assigned thereto; and assigning a pre-defined depth value to one or more pixels of the second set of pixels.

In example 50, the method of example 49 may further include that the depth value assigned to a corresponding pixel of the first set of pixel represents a distance of an obstacle from the depth imaging system.

In example 51, the method of example 49 or 50 may further include that the pre-defined depth value represents a maximal measurement distance of the depth imaging system.

In example 52, the method of any one of examples 49 to 51, further including: discarding pixels of the second set of pixels having not the pre-defined depth value assigned thereto.

In example 53, the method of any one of examples 49 to 52, further including: selecting the one or more pixels for the assignment of the pre-defined depth value thereto randomly from the second set of pixels.

In example 54, the method of example 53 may further include that a fraction of 0.1% to 10% of a total number of pixels is selected from the second set of pixels for the assignment of the pre-defined depth value thereto.

Example 55 is a method for operating a depth imaging system, the method including: generating one or more depth images; determining, for each depth image of the one or more depth images, a first set of pixels and a second set of pixels, each pixel of the first set of pixel has a depth value assigned thereto and each pixel of the second set of pixels has no depth value assigned thereto or has a depth value outside a predefined depth value range assigned thereto; and assigning a pre-defined depth value to one or more pixels of the second set of pixels to generate a modified depth image, the modified depth image including at least the first set of pixels and the one or more pixels of the second set of pixels having the pre-defined depth value assigned thereto.

In example 56, the method of example 55 may further include that the depth value assigned to a corresponding pixel of the first set of pixel represents a distance of an obstacle from the depth imaging system.

In example 57, the method of example 55 or 56 may further include that the pre-defined depth value represents a maximal measurement distance of the depth imaging system.

In example 58, the method of any one of examples 55 to 57, further including: discarding pixels of the second set of pixels having not the pre-defined depth value assigned thereto.

In example 59, the method of any one of examples 55 to 58, further including: selecting the one or more pixels for the assignment of the pre-defined depth value thereto randomly from the second set of pixels.

In example 60, the method of example 59 may further include that a fraction of 0.1% to 10% of a total number of pixels is selected from the second set of pixels for the assignment of the pre-defined depth value thereto.

Example 61 is a depth imaging system, including: one or more depth imaging sensors configured to generate a depth image; and one or more processors configured to determine, for each depth value of the generated depth image, whether the depth value is within a predefined depth value range, and randomly replace the determined depth value with a pre-defined depth value in the case that the depth value is within the predefined depth value range.

In example 62, the depth imaging system of example 61 may further include that the predefined depth value range includes one or more depth values representing a distance of less than 0.5 m. As an example, the predefined depth value range includes a depth value that represents an invalid depth value, e.g. 0.

Example 63 is a method for operating a vehicle, the method including: generating an obstacle map based on depth images in accordance with any one of examples 32 to 48; and avoid a collision of the vehicle with one or more obstacles in a vicinity of the vehicle based on the generated obstacle map.

In some aspects, any method described herein may be partially or completely implemented as a non-transitory computer readable medium with program instructions, which when executed, cause one or more processors to perform at least a portion or all of the method.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. An obstacle map generator comprising one or more processors configured to:
   receive one or more depth images from a depth imaging system,
   determine, for each depth image of the one or more received depth images, a first set of pixels and a second set of pixels, each pixel of the first set of pixels having a depth value assigned thereto and each pixel of the second set of pixels having no depth value assigned thereto or having a depth value outside a predefined depth value range assigned thereto,
   assign a pre-defined depth value to one or more pixels of the second set of pixels, and
   generate an obstacle map based on the determined first set of pixels and the one or more pixels of the second set of pixels having the pre-defined depth value assigned thereto, wherein the generation of the obstacle map comprises, for one or more map positions of the obstacle map, decreasing an occupancy value assigned to a map position of the obstacle map based on the one or more pixels of the second set of pixels having the pre-defined depth value assigned thereto, the occupancy value representing a probability of presence of an obstacle at an absolute position corresponding to the map position.

2. The obstacle map generator of claim 1, wherein the depth value assigned to a corresponding pixel of the first set of pixels represents a distance of an obstacle from the depth imaging system.

3. The obstacle map generator of claim 1, wherein the pre-defined depth value represents a maximal measurement distance of the depth imaging system.

4. The obstacle map generator of claim 1, wherein the one or more processors are further configured to cease using, for the generation of the obstacle map, pixels of the second set of pixels not having the pre-defined depth value assigned thereto.

5. The obstacle map generator of claim 1, wherein the generation of the obstacle map comprises generating map objects representing obstacles in a vicinity of the depth imaging system based on the determined first set of pixels.

6. The obstacle map generator of claim 1, wherein the generation of the obstacle map comprises deleting one or more map objects representing obstacles in a vicinity of the depth imaging system based on the one or more pixels of the second set of pixels having the pre-defined depth value assigned thereto.

7. The obstacle map generator of claim 1, wherein the generation of the obstacle map comprises determining, based on the determined first set of pixels, an occupancy value assigned to a map position of the obstacle map, the occupancy value representing a probability of presence of an obstacle at an absolute position corresponding to the map position.

8. The obstacle map generator of claim 1,
wherein the generation of the obstacle map further comprises:
  determining a first map position representing an absolute position of the depth imaging system,
  determining one or more second map positions representing one or more absolute positions represented by the one or more pixels of the second set of pixels having the pre-defined depth value assigned thereto,
  determining one or more intermediate map positions between the first map position and each of the one or more second map positions, and
  determining an occupancy value for each of the one or more intermediate map positions, the respective intermediate occupancy value representing a probability of presence of an obstacle at an absolute position corresponding to the intermediate map position.

9. The obstacle map generator of claim 8,
wherein the generation of the obstacle map further comprises:
  determining from the one or more pixels of the first set of pixels one or more third map positions representing one or more absolute positions of one or more obstacles in a vicinity of the depth imaging system, and
  determining an occupancy value for each of the one or more third map positions, the determined occupancy value representing a probability of presence of at least one obstacle at an absolute position corresponding to the respective third map position.

10. The obstacle map generator of claim 9,
wherein the generation of the obstacle map further comprises:
  determining one or more intermediate map positions between the first map position and each of the one or more third map positions, and
  determining an occupancy value for each of the one or more intermediate map positions, the respective intermediate occupancy value representing a probability of presence of an obstacle at an absolute position corresponding to the intermediate map position.

11. The obstacle map generator of claim 10,
wherein the obstacle map is a voxel map, the first map position is a first voxel position, the one or more third map positions are one or more third voxel positions, and the one or more intermediate map positions are one or more intermediate voxel positions.

12. The obstacle map generator of claim 11,
wherein the determination of the one or more intermediate voxel positions comprises tracing a ray from the first voxel position to each of the one or more third voxel positions, wherein each voxel at the one or more intermediate voxel positions intersects with the traced ray.

13. The obstacle map generator of claim 8,
wherein the obstacle map is a voxel map, the first map position is a first voxel position, the one or more second map positions are one or more second voxel positions, and the one or more intermediate map positions are one or more intermediate voxel positions.

14. The obstacle map generator of claim 13,
wherein the determination of the one or more intermediate voxel positions comprises tracing a ray from the first voxel position to each of the one or more second voxel positions, wherein each voxel at the one or more intermediate voxel positions intersects with the traced ray.

15. The obstacle map generator of claim 1,
wherein the one or more processors are further configured to select the one or more pixels for the assignment of the pre-defined depth value thereto randomly from the second set of pixels.

16. The obstacle map generator of claim 15,
wherein a fraction of less than 10% of a total number of pixels is selected from the second set of pixels for the assignment of the pre-defined depth value thereto.

17. A vehicle, comprising:
  the depth imaging system configured to generate one or more depth images;
  an obstacle map generator according to claim 1 to generate the obstacle map based on the generated depth images; and
  a collision avoidance system to avoid collision of the vehicle with one or more obstacles in a vicinity of the vehicle based on the generated obstacle map.

18. An obstacle map generator comprising one or more processors configured to:
  receive one or more depth images from a depth imaging system,
  determine, for each depth image of the one or more received depth images, a first set of pixels and a second set of pixels, each pixel of the first set of pixels having a depth value assigned thereto and each pixel of the second set of pixels having no depth value assigned thereto or having a depth value outside a predefined depth value range assigned thereto,
  assign a pre-defined depth value to one or more pixels of the second set of pixels, and
  generate an obstacle map based on the determined first set of pixels and the one or more pixels of the second set of pixels having the pre-defined depth value assigned thereto,
  wherein the one or more processors are further configured to select the one or more pixels for the assignment of the pre-defined depth value thereto randomly from the second set of pixels.

19. The obstacle map generator of claim 18,
wherein a fraction of less than 10% of a total number of pixels is selected from the second set of pixels for the assignment of the pre-defined depth value thereto.

* * * * *